(12) United States Patent
Wachi et al.

(10) Patent No.: US 11,050,941 B2
(45) Date of Patent: Jun. 29, 2021

(54) CAMERA DEVICE AND MANUFACTURING SYSTEM FOR SELECTIVE OUTPUTTING OF IMAGES BASED ON ROTATIONAL POSITION OF THE CAMERA DEVICE

(71) Applicant: PANASONIC I-PRO SENSING SOLUTIONS CO., LTD., Fukuoka (JP)

(72) Inventors: Hayato Wachi, Fukuoka (JP); Haruo Kogane, Fukuoka (JP); Yuki Yoshikuni, Fukuoka (JP); Tetsuya Mizusawa, Fukuoka (JP); Hiroyuki Ishihara, Fukuoka (JP); Yoshihiro Inoue, Fukuoka (JP); Tatsuo Kamei, Fukuoka (JP); Seiji Higashiyama, Fukuoka (JP); Shinichi Tsukahara, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/785,066

(22) Filed: Feb. 7, 2020

(65) Prior Publication Data

US 2020/0382711 A1 Dec. 3, 2020

(30) Foreign Application Priority Data

May 31, 2019 (JP) .............................. JP2019-103209

(51) Int. Cl.
 *H04N 5/232* (2006.01)
 *H04N 5/247* (2006.01)
 (Continued)

(52) U.S. Cl.
 CPC ........... *H04N 5/23299* (2018.08); *G06T 7/20* (2013.01); *H04N 5/2253* (2013.01); *H04N 5/247* (2013.01); *G06T 2207/30108* (2013.01)

(58) Field of Classification Search
 None
 See application file for complete search history.

(56) References Cited

U.S. PATENT DOCUMENTS 1,953,304 A * 4/1934 Lutz ...................... G03B 15/00
 396/12
10,049,248 B1 * 8/2018 Musselman ........ G06K 7/10762
 (Continued)

FOREIGN PATENT DOCUMENTS

DE 112014002755 8/2016
JP 2009-065605 3/2009
 (Continued)

OTHER PUBLICATIONS

European Search Report dated Sep. 14, 2020 issued in European patent application No. 20156090.1.

*Primary Examiner* — Edemio Navas, Jr.
(74) *Attorney, Agent, or Firm* — Greenblum & Bernstein, P.L.C.

(57) ABSTRACT

A camera device is equipped with at least one imaging unit for imaging a subject, a rotary motor for rotating the imaging unit at a prescribed rotation speed, an output unit for outputting images taken by the imaging unit, and a body which incorporates the imaging unit, the rotary motor, and the output unit. The output unit outputs at least one image, among the images, taken at an imaging position where the imaging unit and the subject are approximately parallel with each other.

9 Claims, 29 Drawing Sheets

(51) Int. Cl.
*H04N 5/225* (2006.01)
*G06T 7/20* (2017.01)

(56) References Cited

U.S. PATENT DOCUMENTS

| | | | |
|---|---|---|---|
| 2016/0269647 A1* | 9/2016 | Kim | H04N 7/183 |
| 2016/0330437 A1* | 11/2016 | Kang | H04N 17/002 |
| 2018/0124326 A1* | 5/2018 | Irie | G03B 17/00 |
| 2018/0308192 A1 | 10/2018 | Hayashi | |
| 2020/0068126 A1* | 2/2020 | Fink | H04N 5/247 |

FOREIGN PATENT DOCUMENTS

| | | | |
|---|---|---|---|
| JP | 2009065605 A | * | 3/2009 |
| JP | 2017-076169 | | 4/2017 |

* cited by examiner

ROTATION AXIS

ROTATION AXIS

ROTATION AXIS

ROTATION AXIS

ROTATION AXIS

CAMERA DEVICE AND MANUFACTURING SYSTEM FOR SELECTIVE OUTPUTTING OF IMAGES BASED ON ROTATIONAL POSITION OF THE CAMERA DEVICE

CROSS-REFERENCE TO RELATED APPLICATIONS

This application is based on and claims priority under 35 USC 119 from Japanese Patent Application No. 2019-103209 filed on May 31, 2019, the contents of which are incorporated herein by reference.

TECHNICAL FIELD

The present disclosure relates to a camera device for imaging a subject and a manufacturing system.

BACKGROUND ART

A imaging element is known that is employed in a manufacturing system such as a factory line and is equipped with an imaging unit for imaging a work passing through an imaging range being conveyed by a conveying machine, an illumination unit for illuminating the work passing through the imaging range with light, and a control unit for controlling the imaging unit and the illumination unit (refer to Patent document 1, for example). This imaging element is equipped with a first illumination unit having an opening and a second illumination unit having an opening that is smaller than the opening of the first illumination unit. The imaging element captures a moving work by executing a first imaging process of acquiring an image including a portion formed by reflection light coining from a mark provided in the work from an image taken by turning on only the second illumination unit and a second imaging process of acquiring an image including the work from an image taken by turning on only the first illumination unit on the basis of a result of the first imaging process.

CITATION LIST

Patent Literature

Patent document 1: JP-A-2017-76169

SUMMARY OF INVENTION

However, the imaging element disclosed in above Patent document 1 is large in size because it is equipped with the plural illumination units. Furthermore, in the above imaging element, since the imaging unit has a high shutter speed, a large number of images are taken, image processing takes long time, and a heavy computation load occurs. As a result, a manufacturing system using such an imaging element may suffer a problem that a cycle time is made long (e.g., a line operation speed is made slow).

The concept of the present disclosure has been made in view of the above circumstances and an object of the disclosure is therefore to provide a camera device and a manufacturing system capable of performing image processing efficiently and acquiring a clear image simply in a short time and thereby increasing the production efficiency.

This disclosure provides a camera device including at least one imaging unit which captures a subject; a rotary motor which rotates the imaging unit at a prescribed rotation speed; an output unit which outputs images captured by the imaging unit; and a body which incorporates the imaging unit, the rotary motor, and the output unit. The output unit outputs at least one image, among the images, captured at an imaging position where the imaging unit and the subject are approximately parallel with each other.

The disclosure also provides a manufacturing system including a camera for imaging a subject and an image processing device which is communicably connected to the camera. The camera transmits at least one image taken at an imaging position where the subject and at least one imaging unit being rotated at a prescribed rotation speed are approximately parallel with each other; and the image processing device analyzes a state of the subject on the basis of the at least one image received from the camera and outputs an analysis result.

The disclosure makes it possible to acquire a clear image simply in a short time and thereby increase the production efficiency.

DESCRIPTION OF EMBODIMENTS

Background of Conception of First Embodiment

Figure 1:
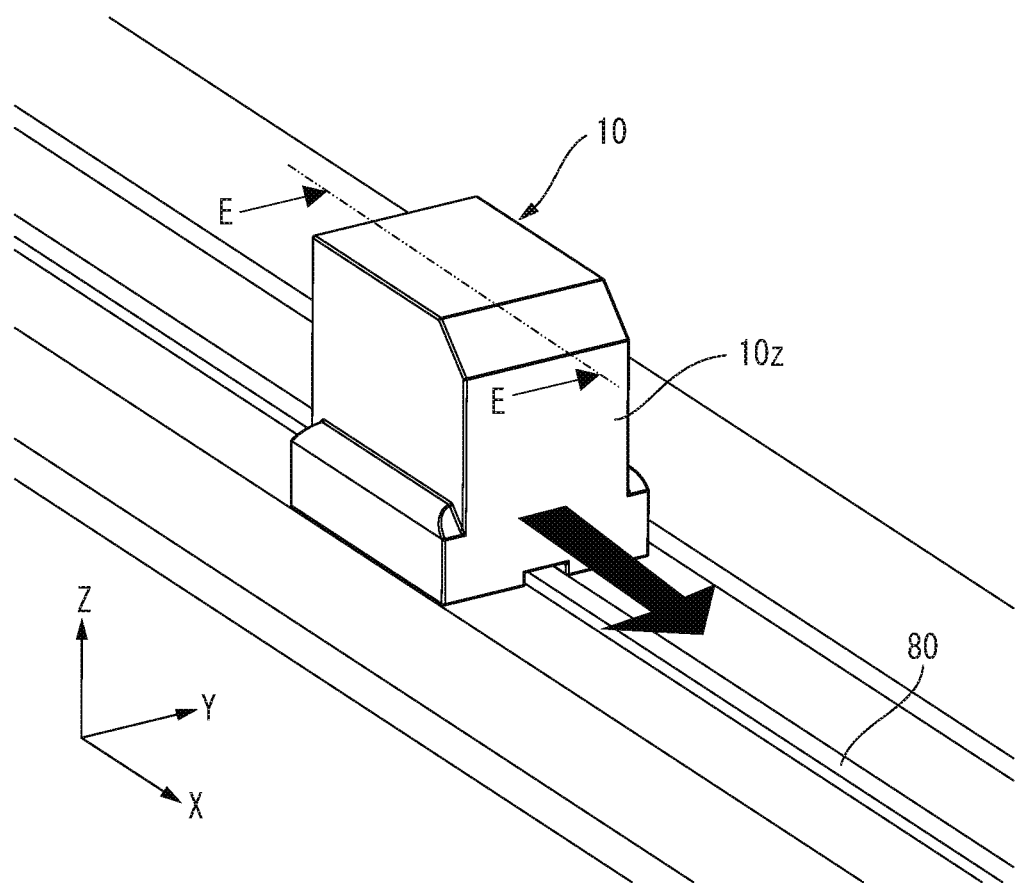
FIG. 1 is a perspective view showing an example inspection device according to a first embodiment.

Patent document 1 discloses an imaging element that is employed in a manufacturing system such as a factory line and obtains an image of a subject (work) having a marker that reflects light shining on it by imaging the subject having the marker by illuminating the subject passing through an imaging range with light. An imaging unit of this imaging element has a high shutter speed. This imaging element can image many subjects being conveyed by a conveying machine and performs image processing on them. However, in the imaging element, because of a large number of images to be subjected to the image processing, a long time is taken to perform the image processing, that is, the imaging element suffers a heavy computation load. As a result, a manufacturing system using such an imaging element may suffer a problem that a cycle time is made long (e.g., a line operation speed is made slow).

The concept of the present disclosure has been made in view of the above circumstances and an object of the disclosure is therefore to provide a camera device and a manufacturing system capable of performing image processing efficiently and acquiring a clear image simply in a short time and thereby increasing the production efficiency.

Camera devices and manufacturing systems according to specific embodiments of the disclosure will be hereinafter described in detail by referring to the drawings when necessary. However, unnecessarily detailed descriptions may be avoided. For example, already well-known items may be refrained from being described in detail and constituent elements having substantially the same ones already described may be refrained from being described redundantly. This is to prevent the following description from becoming unnecessarily redundant and thereby facilitate its understanding by those skilled in the art. The following description and the accompanying drawings are provided to allow those skilled in the art to understand this disclosure sufficiently and they are not intended to restrict the subject matter described in the claims.

First Embodiment

FIG. 1 is a perspective view of an example inspection device according to a first embodiment. A manufacturing system according to the first embodiment is configured so as to include an inspection cart 10 which is the example inspection device. The inspection cart 10 is equipped with a camera unit 30 as an example camera device and moves on a rail 80.

The inspection cart 10 can move freely along the rail 80 which extends straightly. The rail 80 may be a running lane. For example, the rail may be an inspection lane installed alongside a factory line, a conveyance lane dedicated to loads, a lane of a road, a railroad, or the like. The rail is not limited to a straight one, that is, may be curved. The rail 80 is laid in the longitudinal direction of the lane at its center.

The inspection cart 10 performs inspection while imaging the rail 80 or subjects Wk (e.g., works) disposed on the rail 80 while moving on the rail 80. Equipped with a drive device inside, the inspection cart 10 is a self-propelled cart that runs by driving wheels. The inspection cart 10 may be a cart that runs by driving wheels that are kept in contact with the rail 80 by sandwiching the rail 80 from both sides. Alternatively, the inspection cart 10 may be moved being driven by an external drive device.

The inspection cart 10 inspects states of the rail 80 (e.g., finds presence/absence of a scratch, a deteriorated portion, or a damaged portion formed on the rail 80). The inspection cart 10 has an approximately box-shaped case 10z. Devices necessary for inspection of the rail 80 are provided inside the case 10z. It goes without saying that the shape of the case 10z is not limited to a box-like shape as mentioned above.

Figure 2:
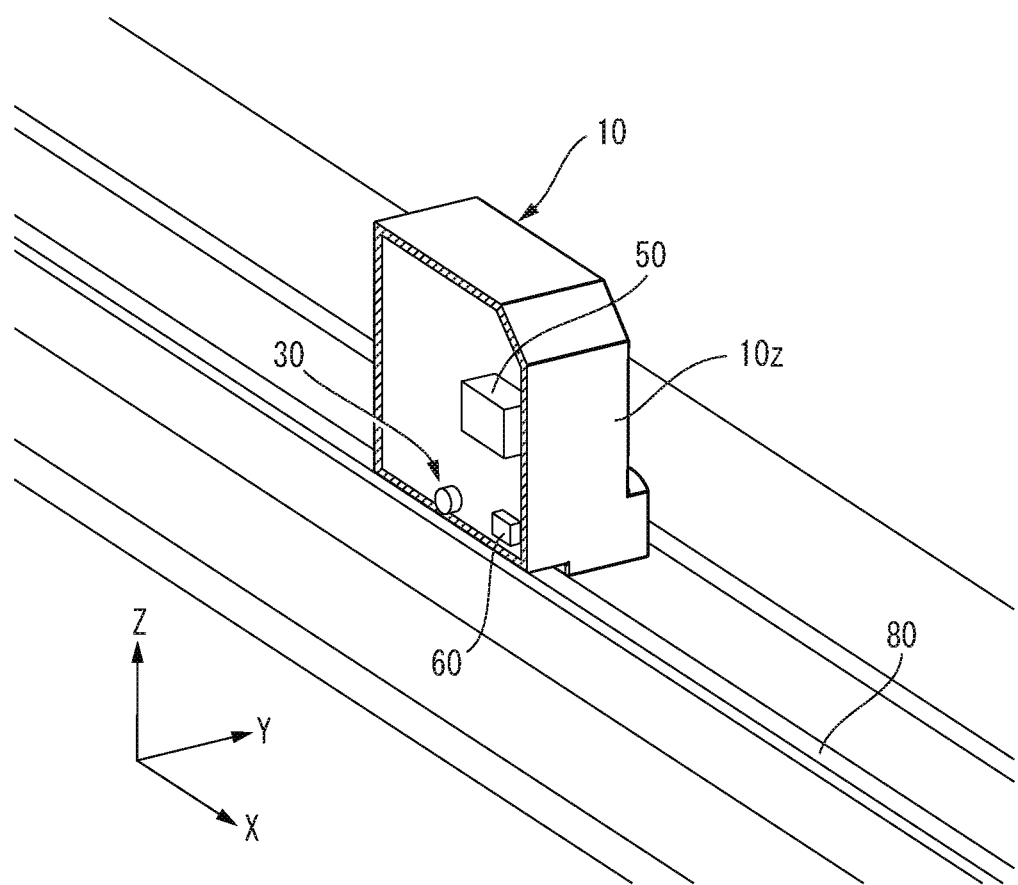
FIG. 2 is a perspective view showing an E-E cross section of an inspection cart shown in FIG. 1.
Figure 3:
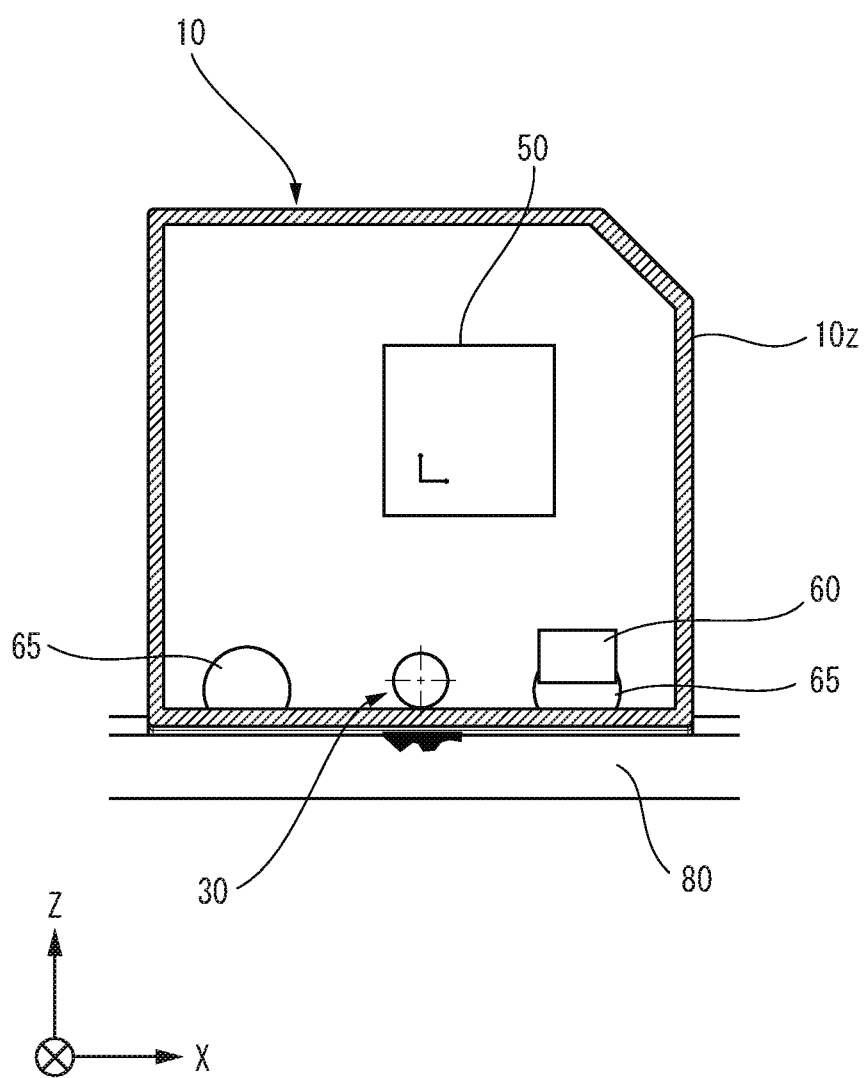
FIG. 3 is an E-E sectional view of the inspection cart shown in FIG. 1.

FIG. 2 is a perspective view showing an E-E cross section of the inspection cart 10 shown in FIG. 1. FIG. 3 is an E-E sectional view of the inspection cart 10 shown in FIG. 1. The inspection cart 10 is connected to a camera control unit 50 so as to be able to communicate with it and is configured so as to include, inside the case 10z, a camera unit 30, an encoder 60, wheels 65, etc.

Directions as coordinate axes are defined as follows. The X direction is defined as a movement direction of the inspection cart 10 (may be the camera unit 30 or the subjects Wk). The Y direction is defined as a direction that is perpendicular to the X direction in a surface that is captured by the camera unit 30. The Z direction is a direction that is perpendicular to the surface that is captured by the camera unit 30. Coordinate axes will be defined in similar manners in following embodiments.

A camera control unit 50 as an example image processing device, which serves to control the camera unit 30, is configured using, for example, a CPU (central processing unit). an MPU (micro processing unit), or a DSP (digital signal processor). The camera control unit 50 generates, at a prescribed frame rate (e.g., 60 fps or 120 fps), data (frames) of an image taken in the form of RGB (red, green, and blue) signals, YUV (luminance and color differences) signals, or the like that can be recognized by humans by performing prescribed signal processing on an image signal received from the camera unit 30. The camera control unit 50 performs image processing on the basis of a received image, taken by the camera unit 30, of a surface of the rail 80 or subjects Wk (e.g., works) disposed on the rail 80. The camera control unit 50 judges whether an abnormality exists in the rail 80 or a subject Wk (e.g., a scratch, a deteriorated portion, or a damaged portion formed on a surface) and outputs a judgment result.

The encoder 60 is an encoder for detection of a speed that detects a rotational position of a rotation axis of one wheel 65 of the inspection cart 10 and detects a speed of the inspection cart 10 on the basis of the number of revolutions per unit time. The encoder 60 can also detect a position of the inspection cart 10 corresponding to a pre-specified distance of the rail 80 on the basis of a rotational position of the rotation axis of the wheel 65. The encoder 60 may be either an absolute encoder capable of detecting an absolute rotational position or an incremental rotary encoder capable of detecting a relative rotational position. The camera unit 30 may be equipped with a speed sensor in place of the encoder 60.

Figure 4:
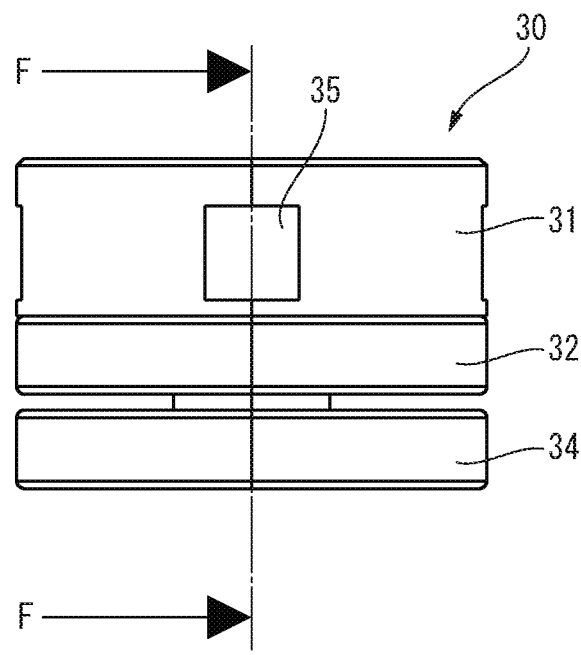
FIG. 4 is a side view showing an example appearance of a camera unit.
Figure 5:
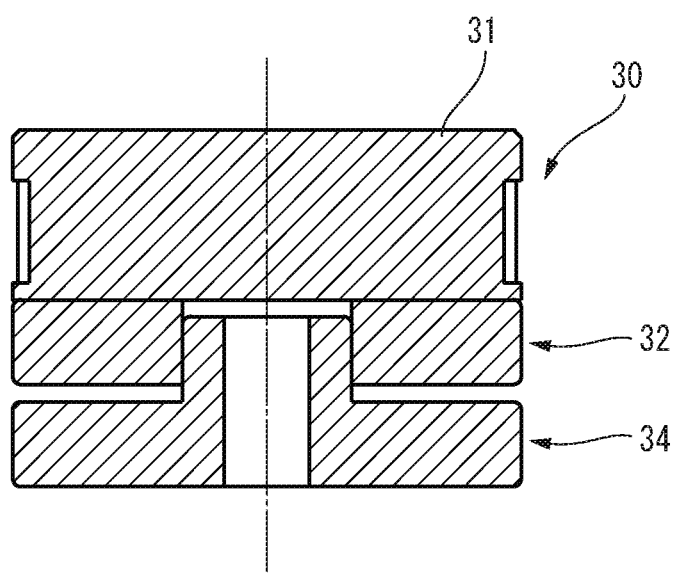
FIG. 5 is an F-F sectional view of the camera unit shown in FIG. 4.

FIG. 4 is a side view showing an example appearance of the camera unit 30. FIG. 5 is an F-F sectional view of the camera unit 30 shown in FIG. 4. The camera unit 30 is configured in such a manner that a drum 31, a wireless power reception unit 32, and a wireless power supply unit 34 are laid on one on another coaxially.

In a side wall (circumferential wall) pf the drum 31, openings are formed. A camera head 35 is disposed in the opening of the drum 31. A camera head 35 is disposed in the opening of the drum 31. The camera head 35 is disposed so as to be able to capture the rail 80 or the subject Wk through the opening formed in the circumferential wall of the drum 31. The camera head 35 captures the subject Wk at a high shutter speed.

The wireless power reception unit 32 has a recess which is a recessed central portion. On the other hand, the wireless power supply unit 34 has a projection which is a projected central portion. The projection of the wireless power supply unit 34 is fitted in the recess of the wireless power reception unit 32, whereby wireless power supply to each of an illumination unit 33, the camera head 35, and a rotary motor 37 is made possible. The thickness of the camera unit 30 can be reduced because the wireless power reception unit 32 and the wireless power supply unit 34 have the above structures. The wireless power reception unit 32 and the wireless power supply unit 34 transmit and receive signals such as a drive signal for the drum 31 and an image signal of the camera head 35. Having the above configuration, the camera unit 30 employed in the first embodiment prevents a harness 43 (see FIGS. 8 and 9) for electrical connection of the camera head 35 and power-supply-side members from being twisted by rotation of the drum 31.

Figure 6:
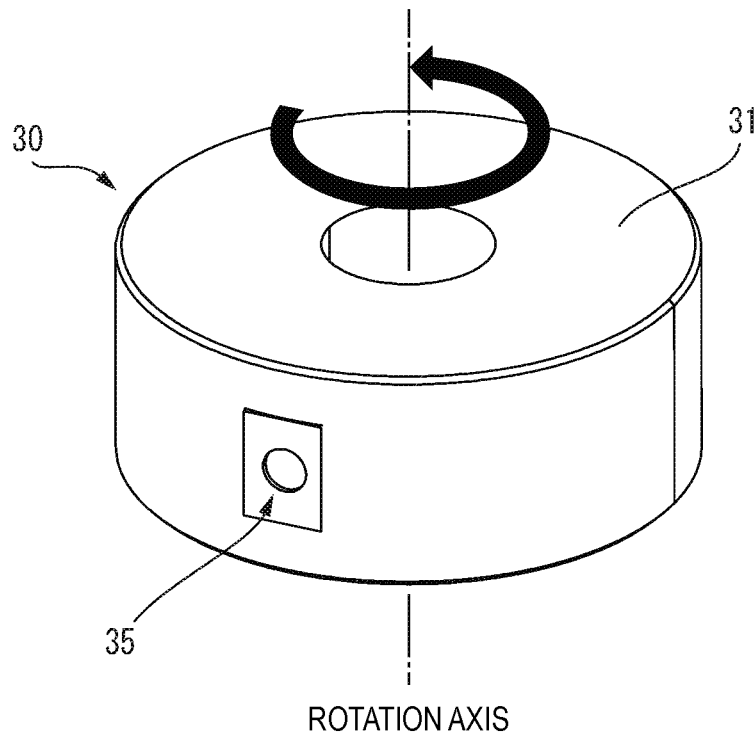
FIG. 6 is a perspective view showing an example rotation direction of a drum.

FIG. 6 is a perspective view showing an example rotation direction of the drum 31. The drum 31 employed in the first embodiment may be shaped like either a circular ring having a central hole or a cylinder having flat side surfaces. The drum 31 can rotate around its rotation axis with respect to the wireless power reception unit 32 and the wireless power supply unit 34. A drive mechanism for rotating the drum 31 may be provided either inside or outside the camera unit 30. For example, the drum 31 may be connected to the shaft of a motor (not shown) directly or via gears and driven rotationally as the motor rotates. Alternatively, the drum 31 may either be in contact with a member vibrated by ultrasonic waves and driven rotationally by vibration produced by an ultrasonic motor or be formed as a rotor of a motor and driven rotationally by its stator.

Although a case that the drum 31 in the first embodiment will be described as one that is rotated in one direction, the drum 31 may be one that is rotated in the normal direction and the reverse direction repeatedly.

Figure 7:
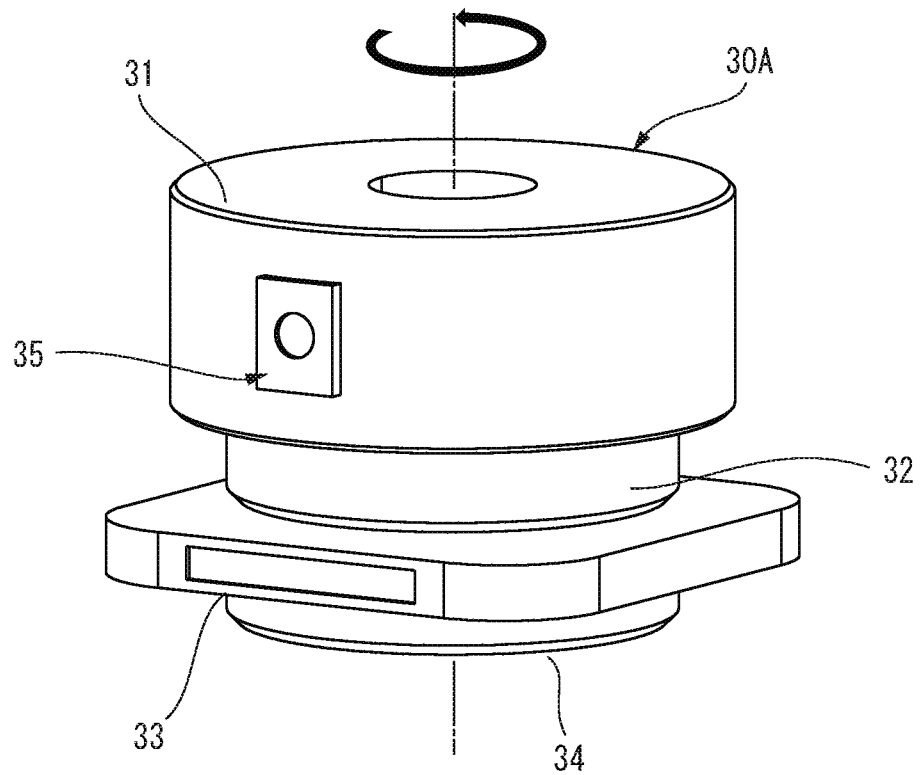
FIG. 7 is a perspective view showing an example appearance of the camera unit.

FIG. 7 is a perspective view showing an example appearance of a camera unit 30A. The camera unit 30A shown in FIG. 7 is configured in such a manner as to include the illumination unit 33 in an integrated component in addition to the camera unit 30. Alternatively, the illumination unit 33 may be provided on the inspection cart 10 so as to be able to illuminate an imaging range of the camera head 35.

The lighting unit 33 is formed in a substantially rectangular plate shape, and illuminates an imaging range of the camera head 35. The illumination unit 33 provides LED (light-emitting diode) illumination, IR (infrared) illumination, or the like. The illumination unit 33 illuminates a subject to be captured by the camera head 35. The illumination unit 33 is not limited to the case of providing LED illumination or IR illumination and may employ an EL (electroluminescence) device, a fluorescent lamp, a white lamp, a halogen lamp, a xenon lamp, or the like.

The wireless power reception unit 32 and the wireless power supply unit 34 of the camera unit 30A shown in FIG. 7 transmit and receive signals such as a drive signal for the drum 31 and an image signal of the camera head 35 by wireless power supply. Having this configuration, the camera unit 30A prevents a harness of the camera head from being twisted by rotation of the drum 31. The wireless power supply method may be any of an electromagnetic coupling method, a magnetic resonance method, and an electromagnetic induction method.

Figure 8:
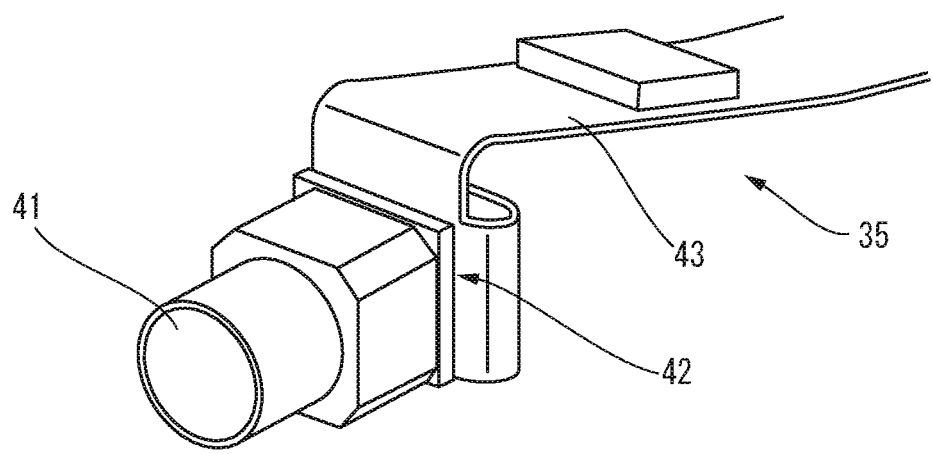
FIG. 8 is a perspective view showing an example internal structure of a camera head.
Figure 9:
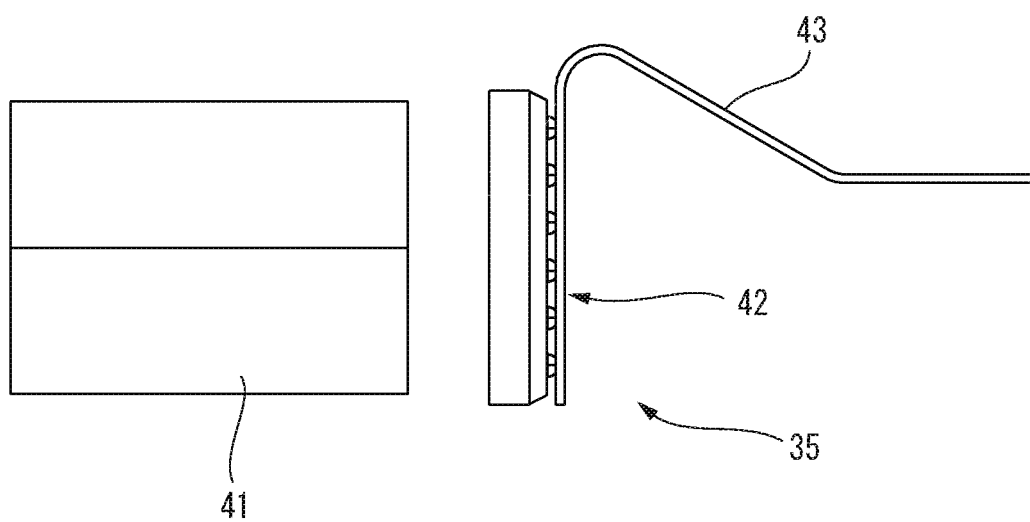
FIG. 9 is a side view showing the example internal structure of the camera head.

FIG. 8 is a perspective view showing an example internal structure of the camera head 35. FIG. 9 is a side view showing the example internal structure of the camera head 35. The camera head 35 as an example imaging unit is housed in a lens barrel (not shown) and is configured so as to include an imaging lens 41, an imaging element 42, and a harness 43. The camera head 35 shown in FIGS. 8 and 9 has an air layer between the imaging lens 41 and the imaging element 42, whereby the focal length is adjusted. The camera head 35 is not limited to a visible light camera, and may be an infrared camera that can emit near infrared light and receive resulting reflection light to enable imaging, for example, during the nighttime or in a dark place.

The imaging lens 41 focuses light coming from outside the camera unit 30 (camera head 35) through an opening of the drum 31 and images it on a prescribed imaging surface of an image sensor (imaging element 42). The imaging lens 41 may be either a fixed lens having a constant focal length or a zoom lens whose focal length is adjustable.

The imaging element 42 is a solid-state imaging element such as a CCD (charge-coupled device) or a CMOS (complementary metal-oxide semiconductor) sensor. The imaging element 42 converts the focused and imaged optical image into an electrical signal and outputs a resulting video signal.

The harness 43 connects the camera head 35 and the wireless power reception unit 32 to each other electrically. The harness 43 supplies power to the camera head 35 and transmits various signals such as a control signal and a video signal (image taken) to and from the imaging element 42. The harness 43 may be either plural signal lines or a flexible wiring board (FPC: flexible printed circuits).

Figure 10:
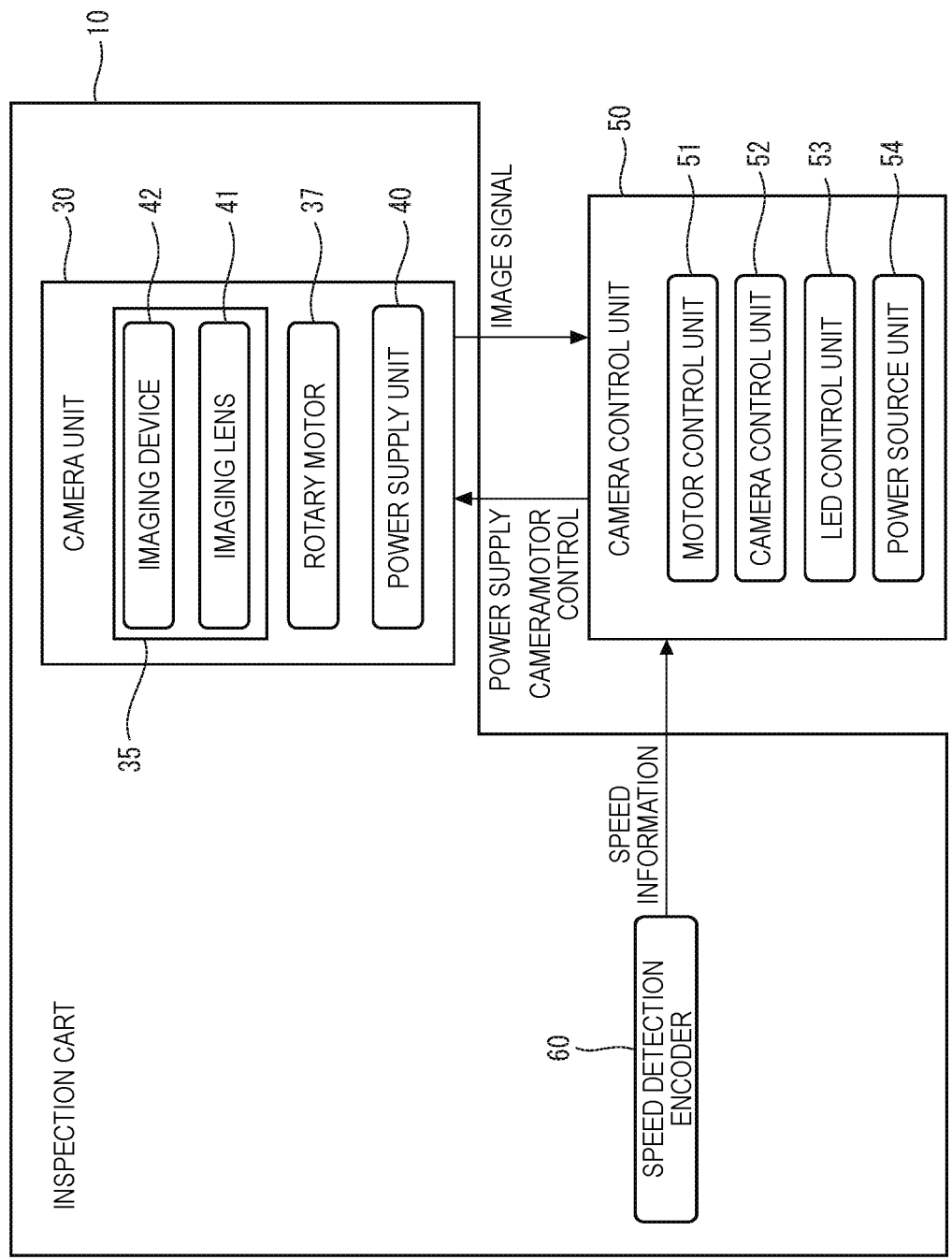
FIG. 10 is a block diagram showing an example internal configuration of a manufacturing system according to the first embodiment.

FIG. 10 is a block diagram showing an example internal configuration of a manufacturing system according to the first embodiment. The manufacturing system according to the first embodiment is configured so as to include the inspection cart 10 as an inspection device and a camera control unit 50. Units and components relating to control such as wheels for driving the inspection cart 10 are omitted in FIG. 10.

The inspection cart 10 incorporates a camera unit 30 for imaging an inspection subject, that is, a rail 80 or a subject Wk on the rail 80. The inspection cart 10 is configured so as to include an encoder 60 and the camera unit 30. The inspection cart 10 may further be equipped with a Hall element capable of detecting a current position of the inspection cart 10 in a movement range (i.e., inspection range), set in advance by a user, of the rail 80.

The encoder 60 detects a movement speed of the inspection cart 10 and transmits it to the camera control unit 50.

The camera unit 30 is installed in the inspection cart 10 in such a manner as to be able to capture the rail 80 or subjects Wk on the rail 80 by means of the camera head 35. Although the camera unit 30 employed in the first embodiment is movable being mounted in the inspection cart 10, the concept of the disclosure is not limited to this case. For example, the camera unit 30 may be equipped with a motor as a moving means for imaging rail 80 or subjects Wk on the rail 80. The camera unit 30 is configured so as to include a rotary motor 37, a power supply unit 40, an imaging lens 41, and an imaging element 42.

The rotary motor 37 rotationally drives the camera unit 30 at a prescribed rotation speed around the rotation axis shown in FIGS. 6 and 7. A rotation speed of e rotary motor 37 is calculated and set by the camera control unit 50.

The power supply unit 40 is configured so as to include a wireless power reception unit 32 and a wireless power supply unit 34. The power supply unit 40 supplies power to an illumination unit 33 (not shown), the camera head 35, the rotary motor 37, etc.

The camera control unit 50 controls the inspection cart 10 and the camera unit and acquires an image taken (image signal) from the camera unit 30. The camera control unit 50 is configured so as to include a motor control unit 51, a camera control unit 52, an LED control unit 53, and a power source unit 54.

The motor control unit 51 transmits a control signal for controlling the movement speed of the inspection cart 10 to a motor (not shown) for driving the inspection cart 10. The motor control unit 51 receives detected speed information of the inspection cart 10 from the encoder 60. The motor control unit 51 compares the received speed information with a movement speed indicated by the transmitted control signal and manages the movement speed of the inspection cart 10. The motor control unit 51 may transmit a control signal that is set by the user.

The motor control unit 51 transmits a control signal for controlling the rotation speed of the camera unit 30 to the rotary motor 37. As for the motor control unit 51, a frame rate of the camera head 35 and a distance between the camera head 35 and a subject Wk are set by the user in advance. The motor control unit 51 calculates a rotation speed of the rotary motor 37 so that the relative speed between the camera head 35 and the subject Wk becomes equal to 0 on the basis of these set values, a movement direction and speed of the inspection cart 10, and a movement direction and speed of the subject Wk. The motor control unit 51 transmits a control signal generated on the basis of the calculated rotation speed to the rotary motor 37.

The camera control unit 52 controls the shutter speed, the imaging start timing, and the imaging end timing of the camera head 35. The camera control unit 52 receives an image signal of an image taken by the camera head 35. The camera control unit 52 performs image processing on the basis of an image taken (image signal) received from the camera unit 30. The camera control unit 52 judges whether a portion of the rail 80 or a subject Wk existing in an image taken has an abnormality (e.g., scratch, fatigue, or foreign substance) and outputs a judgment result.

The camera control unit 50 may measure a current position of the inspection cart 10 on the basis of movement information received from the encoder 60 and a movement range (e.g., inspection range) that was set by the user in advance. Where the inspection cart 10 is equipped with a component such as a Hall element capable of detecting current position information, the camera control unit 50 may estimate a current position of the inspection cart 10 on the basis of this position information. Where the position of subjects Wk is fixed, the camera control unit 50 may control the imaging timing of the camera head 35 (i.e., an image to be received) on the basis of a current position of the inspection cart 10 measured or estimated on the basis of a movement range or position information.

The LED control unit 53 controls an illumination unit 33 provided in or for the inspection cart 10 or the camera head 35.

When turned on by the user, the power source unit 54 supplies power to the individual units and components of the camera control unit 50 and the camera unit 30.

Figure 11:
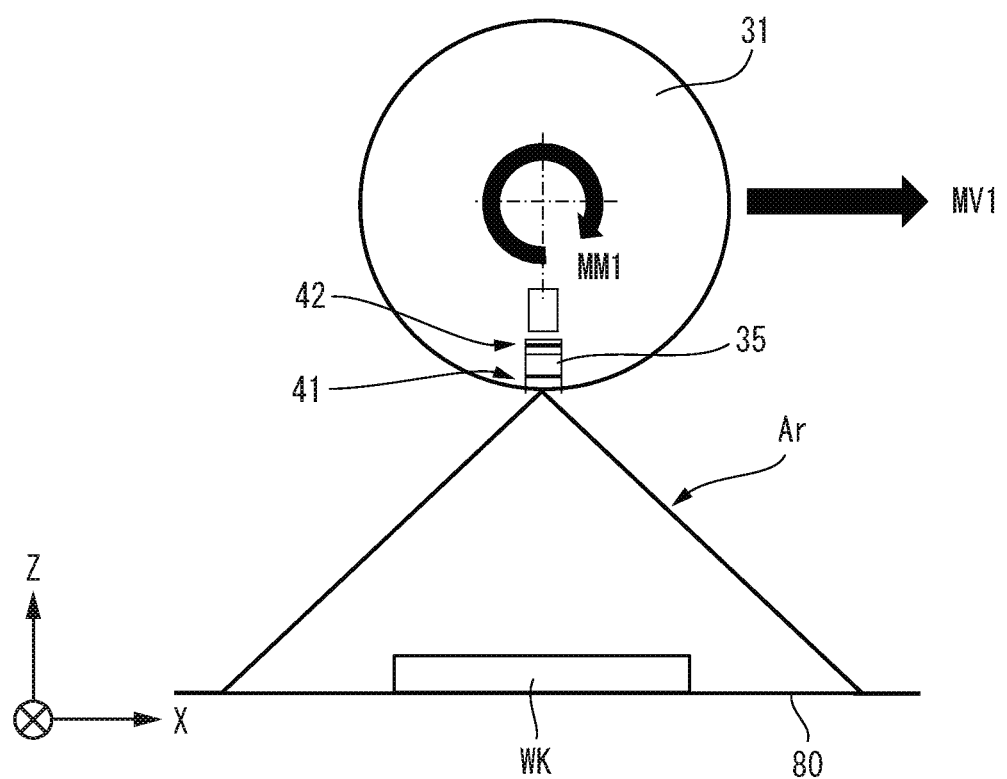
FIG. 11 is a diagram showing an imaging example of subject captured by the camera head.

FIG. 11 is a diagram showing an example of how a subject Wk is captured by the camera head 35. In the example of imaging shown in FIG. 11, the inspection cart 10 is moving straightly in a direction MV1. The camera unit 30 is rotating in a direction MM1 around the rotation axis of the drum 31. A position Oj (described later) on the subject Wk being captured by the camera head 35 is a position at which the camera head 35 is focused. As the inspection cart 10 moves and the camera unit 30 rotates, the camera head 35 is moved so as to form a trace that is shaped like a cycloid curve. The inspection cart 10 is omitted in FIG. 11 to describe positional relationships between the drum 31, the subject Wk, and the camera head 35 that is imaging the subject Wk.

The imaging lens 41 of the camera head 35 focuses, with a prescribed angle of view Ar, light coming from the subject Wk and forms an optical image of the subject Wk located at the position Oj on the imaging surface of the imaging element 42. The camera unit 30 starts transmitting an image of the subject Wk to the camera control unit 50 when or immediately before the relative speed between the camera head 35 and the subject Wk becomes equal to 0. A time during which the camera unit 30 transmits images of the subject Wk to the camera control unit 50 is from immediately before the above-mentioned relative speed becomes equal to 0 to a time when it can no longer be regarded as being equal to 0. That is, images transmitted from the camera head 35 are ones that are taken while the camera head 35 can be regarded as being parallel with the subject Wk (in other words, the relative speed between the camera head 35 and the subject Wk is approximately equal to 0).

The camera head 35 may transmit images taken according to a signal indicating imaging timing received from the camera control unit 50.

The subject Wk shown in FIG. 11 may be one other than the rail 80 along which the inspection cart 10 can move, such as a work that is conveyed by a belt conveyor (described later). That is, the movement speed of the subject Wk need not be equal to 0.

Figure 12:
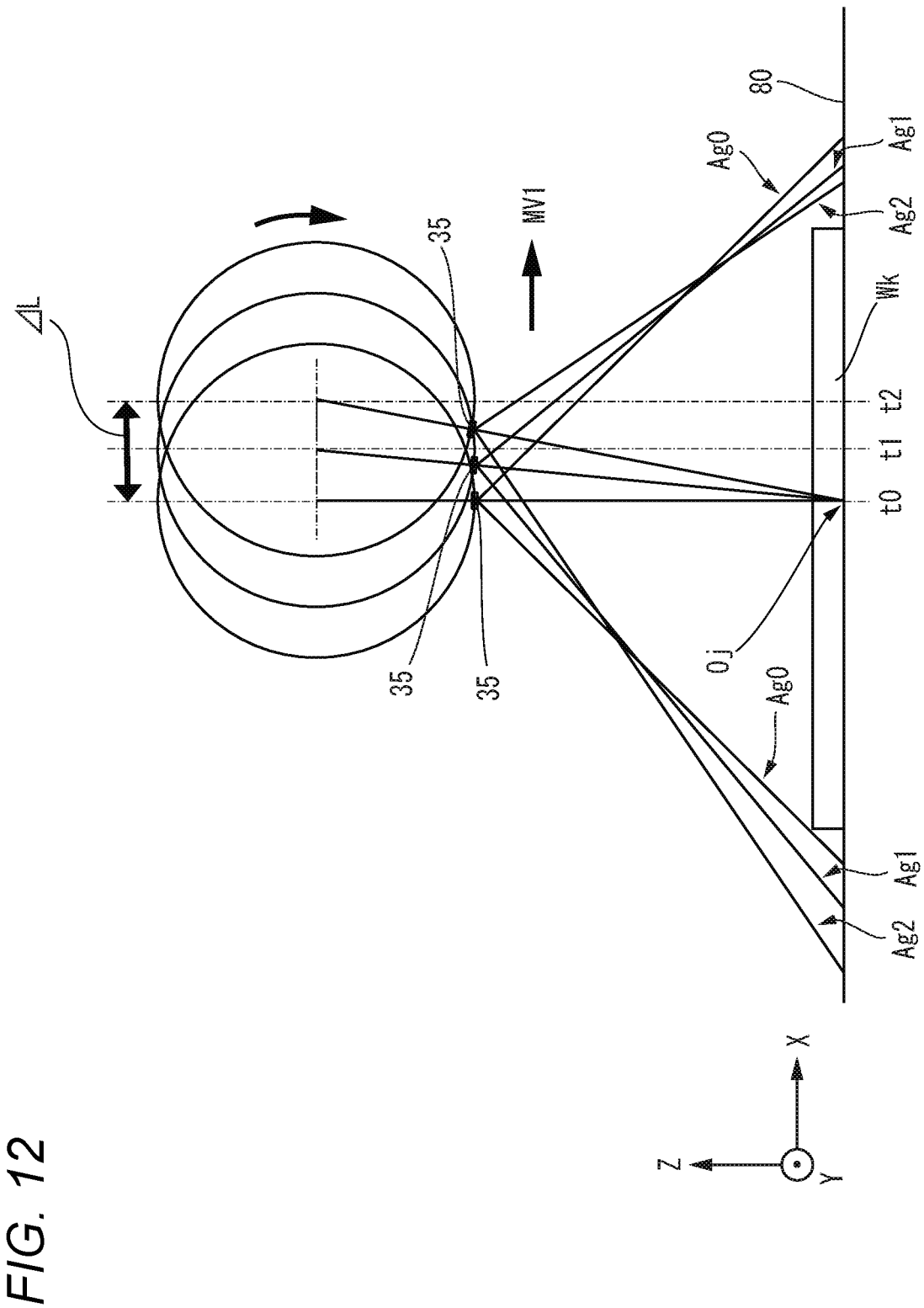
FIG. 12 is a diagram showing an example of how the angle of view of the camera head varies as it moves in a time taken by imaging.

FIG. 12 is a diagram showing an example of how the angle of view of the camera head 35 varies as it moves in a time taken by imaging. Referring to FIG. 12, the inspection cart 10 (not shown) moves in a direction MV1. In FIG. 12, as in FIG. 11, The inspection cart 10 and the rail 80 are omitted to describe positional relationships between the drum 31, the subject Wk, and the camera head 35 that is imaging the subject Wk.

A locus of a point at which the camera head 35 is focused (i.e., a position Oj that is located on the subject Wk when the relative speed between the camera head 35 and the subject Wk is equal to 0) is what is called a cycloid curve. The camera head 35 becomes parallel with the subject Wk on the rail 80 (the relative speed between them becomes approximately equal to 0) at time t0 when the camera head 35 is located at the lowest position of its locus. The camera head 35 transmits, to the camera control unit 50, images from an image taken at time t0 or a time immediately before time t0 when imaging is started to an image taken at time t2.

At time t0, the camera head 35 is in a state that its speed relative to the subject Wk is equal to 0. The camera unit 30 transmits an image of the subject Wk taken at time t0 to the camera control unit 50. At this time point, the position Oj on the subject Wk is located at the center of an angle of view Ag0. At time t1, the camera head 35 is in a state that its speed relative to the subject Wk is approximately equal to 0. The camera unit 30 transmits an image of the subject Wk taken at time t1 to the camera control unit 50. At this time point, the position Oj on the subject Wk is located at the center of an angle of view Ag1. At time t2, the camera head 35 is in a state that its speed relative to the subject Wk is approximately equal to 0. The camera unit 30 transmits an image of the subject Wk taken at time t2 to the camera control unit 50. At this time point, the position Oj on the subject Wk is located at the center of an angle of view Ag2. After time t2, the transmission of an image of the subject Wk is not transmitted.

As described above, the camera head 35 which is incorporated in the inspection cart 10 starts imaging at time t0 and finishes the imaging at time t2. The camera head 35 moves by a distance ΔL in the direction MV1 from time t0 to time t2. During that time, the position Oj where the camera head 35 is focused (i.e., the position on the subject Wk in the angle of view of the imaging by the camera head 35) does not vary irrespective of the movement distance ΔL of the camera head 35, that is, the position Oj which is located in the angles of view corresponding to images taken at times t0, t1, and t2 does not vary. The relative speed between the subject Wk and the camera head 35 is kept approximately equal to 0 from time t0 to time t2. Peripheral portions of an image taken by the camera head 35 are distorted because the movement distance of the camera head 35 itself is long.

The relative speed between the camera head 35 and the subject Wk is kept equal to 0 or can be regarded as being kept approximately equal to 0 from time t0 to time t2. The time during which the relative speed can be regarded as being kept approximately equal to 0 is a time slot during which images can be taken that allow the camera control unit 50 to perform image processing on them and image analysis for, for example, detection of an abnormality of the subject Wk. The time from time t0 to time t2 varies depending on the movement speed of the inspection cart 10, the rotation speed of the camera head 35, the movement speed of the subject Wk, the imaging distance between the camera head 35 and the subject Wk, etc. Thus, the time from time t0 to time t2 may be either set automatically by the camera control unit 50 on the basis of the above values or set by the user.

Figure 13:
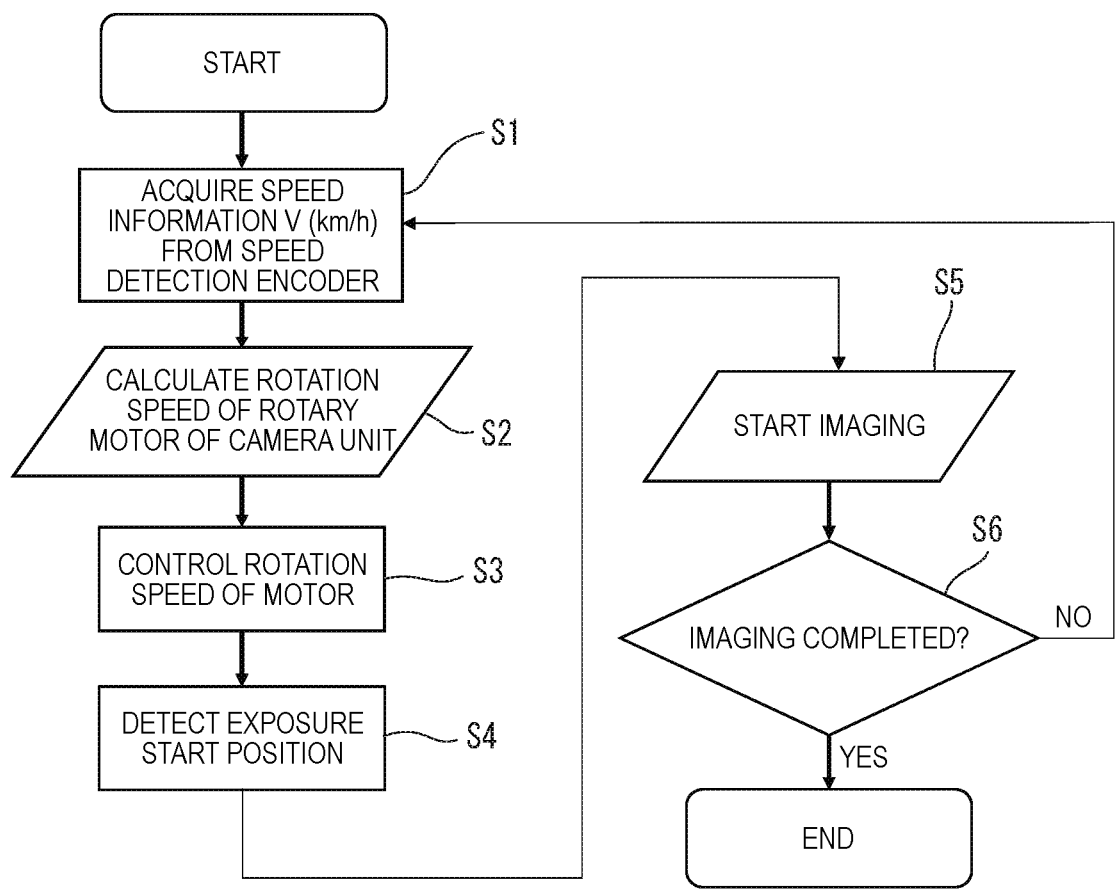
FIG. 13 is a flowchart showing an example operation procedure of a camera control unit according to the first embodiment.

FIG. 13 is a flowchart showing an example operation procedure of the camera control unit 50 employed in the first embodiment. The example operation procedure of the camera control unit 50 shown in FIG. 13 is directed to the example of imaging shown in FIG. 11. In the example operation procedure shown in FIG. 13, the subject Wk shown in FIG. 11 does not move, that is, its movement speed is equal to 0.

At step S1, the motor control unit 51 receives and acquires speed information of the inspection cart 10 from the encoder 60. For example, the speed information of the inspection cart 10 is a movement speed V (km/h) of the inspection cart 10.

At step S2, the motor control unit 51 calculates a rotation speed of the rotary motor 37, that is, the number of revolutions per unit time of the drum 31, on the basis of the received speed information according to Equation (1). A method for calculating a rotation speed R of the rotary motor 37 will be described below.

A rotation speed R (rps) of the rotary motor 37 is calculated according to Equation (1) so that the relative speed between the camera head 35 which moves at the movement speed V together with the inspection cart 10 and the subject Wk (or rail 80). That is, Equation (1) is an equation for calculating a rotation speed R of the rotary motor 37 that makes equal to 0 the relative speed between the movement speed (in the X direction) of the surface of the subject Wk to be captured by the camera head 35 and the movement speed of the camera head 35 of the inspection cart 10 at a position where the subject Wk and the camera head 35 are parallel with and closest to each other. A distance $r_1$ (mm) between the camera head 35 and the subject Wk and a radius $r_2$ (mm) of rotation of the camera head 35 (i.e., the radius of the drum 31, 31A) may be set by the user in advance.

[Formula 1]

$$R = \frac{V \ (m/s) \times 1000}{2\pi \ (r_1 + r_2)} \quad (1)$$

Using Equation (1), a rotation speed R (rps) of the camera head 35 shown in FIG. 11 can be calculated to be 52 (rps) when, for example, V=70 km/h (19.4 m/s), $r_1$=30 mm, and $r_2$=30 mm. The movement sped of the subject Wk shown in FIG. 11 is equal to 0. Thus, where the subject Wk is moved, it is necessary to calculate a rotation speed R (rps) of the rotary motor 37 further on the basis of a movement direction of the subject Wk, a movement direction of the inspection cart 10, and a rotation direction of the camera head 35.

At step S3, the motor control unit 51 generates a control signal to be used for rotating the rotary motor 37 on the basis of the calculated rotation speed R and transmits the generated control signal to the rotary motor 37. The rotary motor 37 is driven rotationally at the rotation speed R on the basis of the received control signal.

At step S4, the camera control unit 52 detects, as an exposure start position (exposure start timing), timing at which the relative speed between the camera head 35 and the subject Wk becomes equal to 0, that is, a position where the camera head 35 and the subject Wk becomes parallel with each other. Although the term "exposure start position" is used above, it is noted that the imaging element 42 continues to receive light coming from the subject Wk (optical image) and output an image signal after an inspection start manipulation was made by the user.

Upon detecting an exposure start position at step S4, at step S5 the camera control unit 52 receives an image signal that is transmitted from the imaging element 42.

At step S6, the camera control unit 50 judges whether the inspection cart 10 has completed a prescribed imaging process that was set by the user. For example, the camera control unit 50 may finish the imaging either when the inspection cart 10 has passed an inspection interval set by the user or when an inspection finishing manipulation is made by the user.

If judging that the imaging has not been completed yet (S6: no), the camera control unit 50 returns to step S1.

On the other hand, if judging that the imaging has been completed (S6: yes), the camera control unit 50 finishes the inspection process.

As described above, while the inspection cart 10 employed in the first embodiment runs along the rail 80, the camera head 35 which is disposed in the circumferential surface of the rotating drum 31 captures the rail 80 and the subject Wk on the rail 80 continuously at an imaging position where the camera head 35 is approximately parallel with the rail 80 or the subject Wk on the rail 80. That is, timing at which the imaging element 42 starts to be exposed to light (in other words, timing at which the imaging element 42 starts transmitting data of an image taken to the camera control unit 50) is timing at which the relative speed between the movement speed of the subject Wk to be captured by the camera head 35 and that of the camera head 35 becomes equal to 0. Since in this state the rail 80 or the subject Wk on the rail 80 is stopped relative to the camera head 35, a blur of the rail 80 or the subject Wk on the rail 80 existing in an image taken by the imaging element 42 can be made small. As a result, the camera head 35 can produce a clear image of the rail 80 or the subject Wk even if the inspection cart 10 is moving along the rail 80 at high speed.

Thus, the camera control unit 50 can detect (make a judgment about) an abnormality (e.g., a scratch, a deteriorated portion, or a damaged portion formed on its surface) of the rail 80 or the subject Wk in a shorter time on the basis of data of images taken.

Although in the above-described manufacturing system according to the embodiment the camera control unit 50 has functions of an image processing device, an image processing device may be provided separately from the camera control unit 50. In this case, the image processing device performs analysis about presence/absence of an abnormality (e.g., a scratch, a deteriorated portion, or a damaged portion formed on its surface) of the rail 80 or the subject Wk by doing image analysis on data of images taken that are received from the camera control unit 50 and outputs an analysis result to a monitor, an alarm lamp, or the like.

First Modification of First Embodiment

The manufacturing system according to the first embodiment is such that the inspection cart 10 captures a subject Wk while the inspection cart 10 is moving. A manufacturing system 100A according to a first modification of the first embodiment will be described below in which a camera unit 30A captures each of plural subjects Wk that are moving. In the first modification of the first embodiment, the same constituent elements as in the first embodiment will be given the same reference symbols and will not be described in detail.

Figure 14:
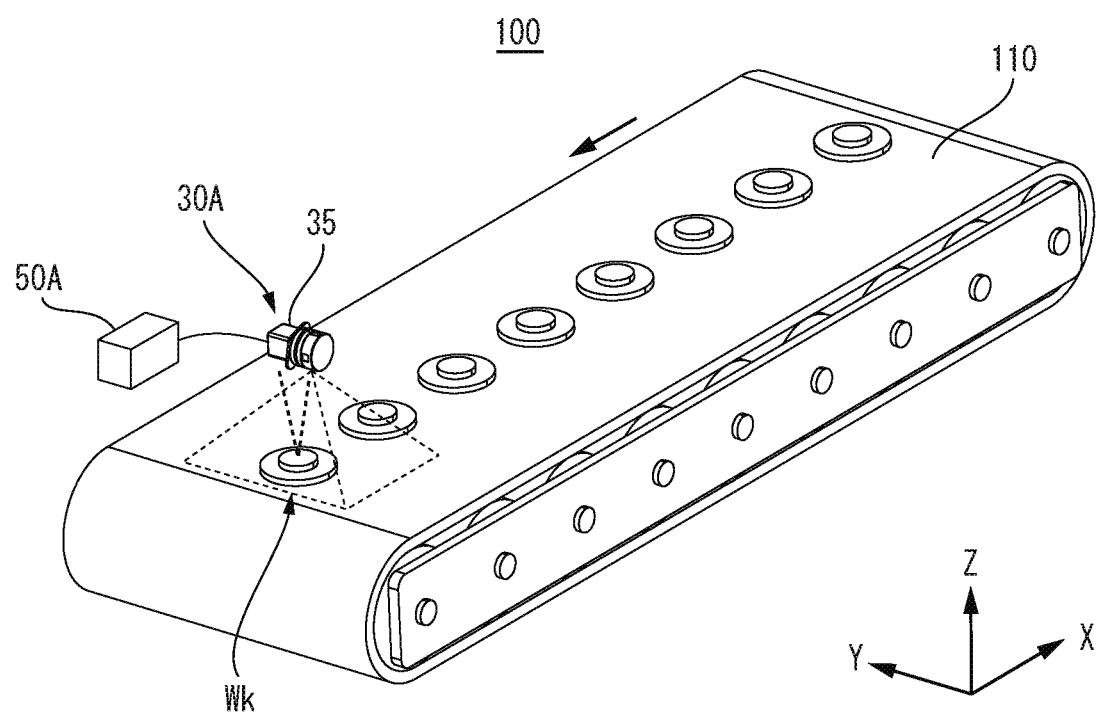
FIG. 14 is a schematic view of an example manufacturing system including a camera unit according to a first modification of the first embodiment.

FIG. 14 is a rough view of an example manufacturing system 1004 that includes a camera unit 30A according to the first modification of the first embodiment. In the manufacturing system 100A according to the first modification of the first embodiment, the camera unit 30A that is installed fixedly captures subjects Wk moving at a constant speed. The subjects Wk may be moved either being conveyed by a conveying machine such as a belt conveyor 110 (see FIG. 14) or being driven by moving means provided in themselves. The manufacturing system 100A is configured so as to include the camera unit 30A and a camera control unit 50A. The camera head 35 is configured similarly to the camera unit 30 employed in the first embodiment and is disposed in the circumferential surface of a drum 31 which is rotated.

The camera unit 30A according to the first modification of the first embodiment captures each of the plural subjects Wk being conveyed by a belt conveyor 110. Like the camera unit 30 or 30A according to the first embodiment, the camera unit 30A captures each subject Wk with such timing that the relative speed between the camera head 35 and the subject Wk becomes equal to 0 (in other words, the camera head 35 and the subject Wk become approximately parallel with each other).

Imaging targets of the camera unit 30A according to the first modification of the first embodiment are not limited to plural subjects Wk that are conveyed at a constant speed so as to be arranged at the same interval as shown in FIG. 14. Where the plural subjects Wk are neither arranged at the same interval nor conveyed at a constant speed, the camera control unit 50A may be configured so as to be able to capture the subjects Wk by calculating a movement speed of each subject Wk on the basis of a variation of the position of the subject Wk detected by a Hall element (not shown) or a variation of the position of the subject Wk existing in at least two images (frames) taken immediately before and rotating the rotary motor 37 according to the calculated movement speed.

Figure 15:
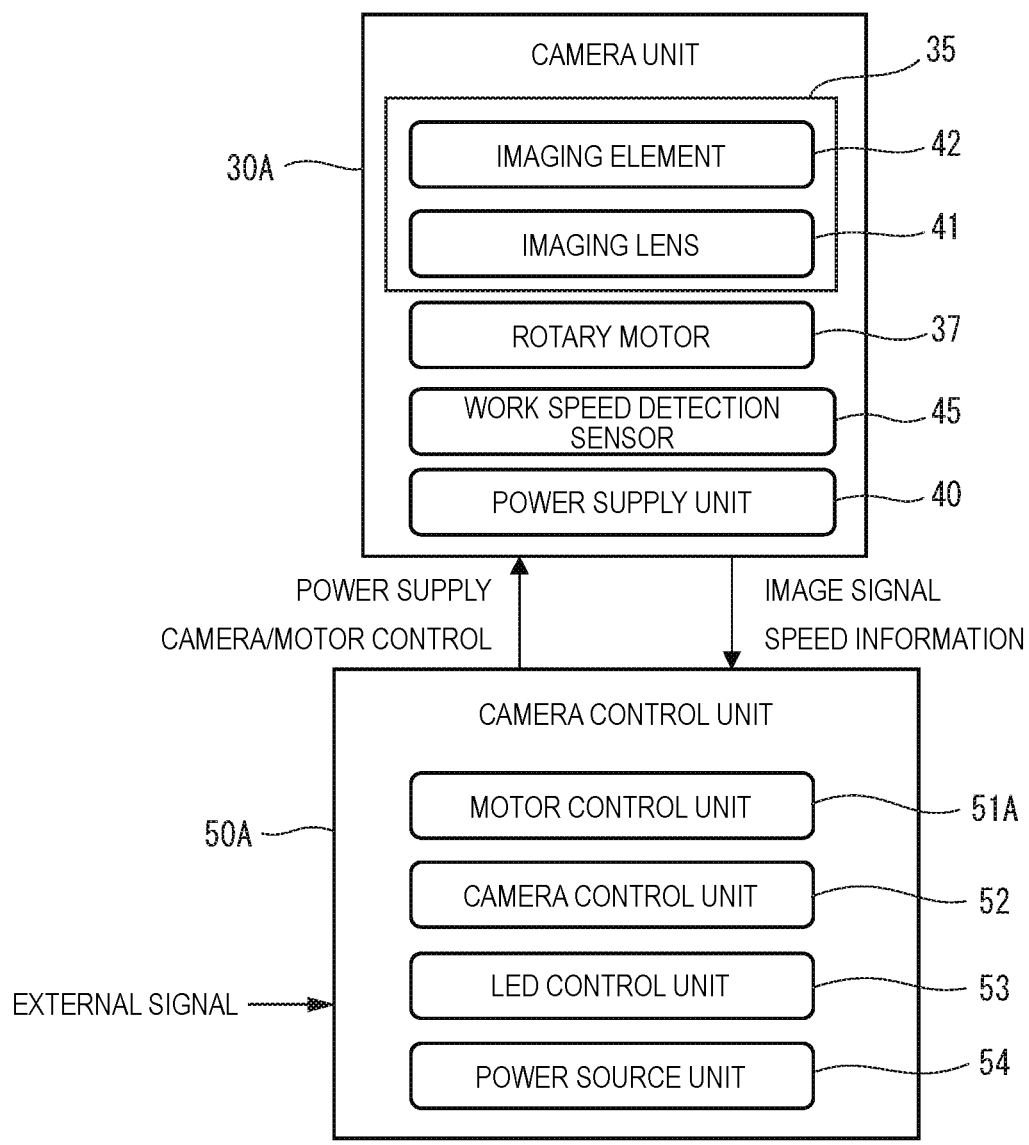
FIG. 15 is a block diagram showing an example internal configuration of the manufacturing system according to the first modification of the first embodiment.

FIG. 15 is a block diagram showing an example internal configuration of the manufacturing system 100A according to the first modification of the first embodiment. The manufacturing system 100A is configured so as to include the camera unit 30A and a camera control unit 50A.

The camera unit 30A is configured so as to include a work speed detection sensor 45 in addition to the imaging lens 41, the imaging element 42, the rotary motor 37, and the power supply unit 40 which were described in the first embodiment. The imaging lens 41, the imaging element 42, the rotary motor 37, and the power supply unit 40 will not be described in detail because they have the same functions and operate in the same manners as in the first embodiment.

The work speed detection sensor 45 detects a movement speed of each of the subjects (works) Wk being conveyed by the belt conveyor 110. The work speed detection sensor 45 is, for example, a Hall element, which detects a position of each of the subjects Wk on the basis of a magnetic field variation caused by a magnet attached to the subject Wk. The work speed detection sensor 45 detects a movement speed of each of the subjects Wk on the basis of detected positions of the respective subjects Wk.

Alternatively, the work speed detection sensor 45 may be a fixed-point camera. The fixed-point camera detects a movement speed of each of the subjects (works) Wk by measuring a position variation of the subject Wk existing in at least two images (frames) taken by performing image analysis on the at least two images. In this case, a movement speed of each of the subjects Wk can be detected easily without using additional electronic device such as a Hall element.

The work speed detection sensor 45 transmits the detected movement speed information of each of the subjects (works) Wk to the camera control unit 50A. The camera control unit 50A may calculate a rotation speed R of the rotary motor 37 adaptively on the basis of the received movement speed of each subject Wk. The camera control unit 50A transmits the calculated rotation speed R to the camera unit 30A. As a result, the camera unit 30A can change the rotation speed R when necessary according to a movement speed of a subject Wk and hence can capture the subject Wk in a state that the relative speed between the camera head 35 and the subject Wk is made approximately equal to 0.

Imaging targets of the camera unit 30A according to the first modification of the first embodiment are not limited to plural subjects Wk that are conveyed being arranged at the same interval as shown in FIG. 14. Thus, the camera unit 30A may have such an angle of view that plural subjects Wk exist in one image taken.

The camera control unit 504 is configured so as to include a motor control unit 51A, a camera control unit 52, an LED control unit 53, and a power source unit 54. The motor control unit 51A calculates a rotation speed R of the rotary motor 37 on the basis of received speed information of a subject Wk and generates a control signal for controlling the rotary motor 37.

The camera control unit 50A may have an external input interface and receive a conveyance speed of the belt conveyor 110 via the external input interface. In this case, the camera control unit 50A may infer that a movement speed of the subjects Wk is equal to that of the belt conveyor 110: the work speed detection sensor 45 can be omitted.

Figure 16:
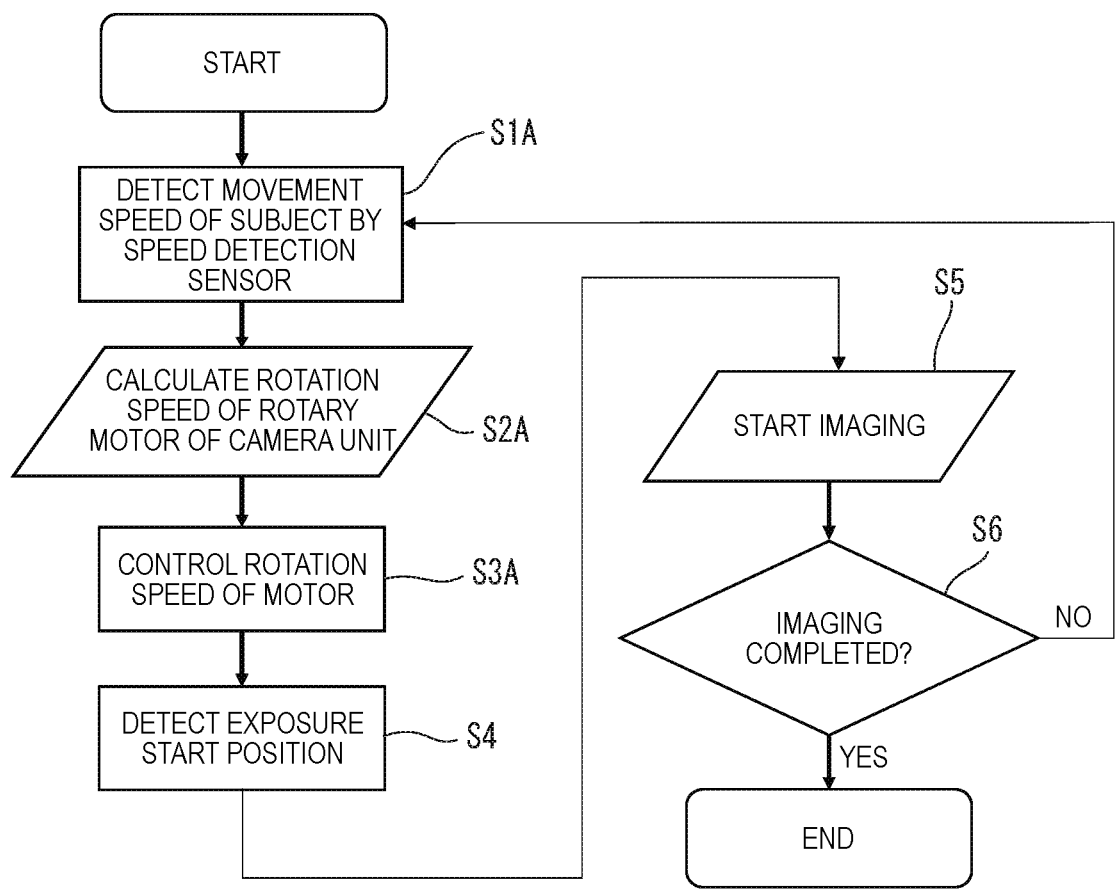
FIG. 16 is a flowchart showing an example operation procedure of the manufacturing system according to the first modification of the first embodiment.

An operation procedure of the manufacturing system 100A shown in FIGS. 14 and 15 will be described with reference to FIG. 16. FIG. 16 is a flowchart showing an example operation procedure of the manufacturing system 100A according to the first modification of the first embodiment.

At step S1A, the motor control unit 51A receives and acquires speed information of a subject Wk from the work speed detection sensor 45. For example, the speed information may be a conveyance speed that is set for the belt conveyor 110.

At step S2A, the motor control unit 51A calculates a rotation speed R of the rotary motor 37, that is, the number of revolutions per unit time of the drum 31, on the basis of the received speed information according to Equation (2). The movement speed $V_A$ (m/s) in Equation (2) is the movement speed of the subject Wk.

[Formula 2]

$$R = \frac{V_A \ (m/s) \times 1000}{2\pi (r_1 + r_2)} \qquad (2)$$

Equation (2) is an equation for calculating a rotation speed R of the rotary motor 37 that makes equal to 0 the relative speed between the movement speed (in the X direction) $V_A$ of the surface of the subject Wk to be captured by the camera head 35 and the movement speed of the camera head 35 at a position where the camera head 35 is closest to the moving subject Wk (i.e., a position where the camera head 35 and the subject Wk are parallel with each other).

At step S3A, the motor control unit 51A generates a control signal to be used for rotating the rotary motor 37 on the basis of the calculated rotation speed R and transmits the generated control signal to the rotary motor 37. The rotary motor 37 is driven rotationally at the rotation speed R on the basis of the received control signal.

Steps S4 to S6 will not be described in detail because they are the same as in the operation procedure of the manufacturing system according to the first embodiment.

As described above, in the manufacturing system 100A according to the first modification of the first embodiment, plural subjects Wk being conveyed by the belt conveyor 110 are captured by the camera head 35 continuously. Timing at which the imaging element 42 starts to be exposed to light (in other words, timing at which data of an image taken is transmitted to the camera control unit 50A) is timing at which the relative speed between the movement speed of each subject Wk to be captured by the camera head 35 and that of the camera head 35 of the inspection cart 10 becomes equal to 0. Since in this state the subject Wk on the belt conveyor 110 is stopped relative to the camera head 35, a blur of the subject Wk existing in an image taken by the imaging element 42 can be made small. As a result, the camera head 35 can produce a clear image of the subject Wk even if the belt conveyor 110 is conveying the subject Wk at a conveyance speed that is higher than a conventional conveyance speed.

Thus, the camera control unit 50A can detect (make a judgment about) an abnormality (e.g., a scratch, a deteriorated portion, or a damaged portion formed on its surface) of each subject Wk in a shorter time on the basis of data of images taken.

Second Embodiment

The camera unit 30 according to the first embodiment has one camera head 35 which is disposed in the circumferential surface of the drum 31. Provided with only one camera head 35, the camera unit 30 according to the first embodiment is restricted in the imaging-possible angle of view and the imaging timing. Since it is preferable that a subject Wk be captured so as to included in the angle of view in its entirety, it is difficult to shorten the imaging distance between the camera head 35 and the subject Wk. In the camera unit 30 according to the first embodiment, the resolution of an image taken is low because it employs the same kind of illumination (illumination unit 33) as in conventional cases to prevent its size increase. Furthermore, in the camera unit 30 according to the first embodiment, since the camera head 35 performs imaging while rotating, peripheral portions of an image taken may be distorted more than its central portion.

In view of the above, in a camera unit 30 9 according to a second embodiment, plural camera heads are provided in the peripheral surface of a drum 31A. In the camera unit 30B according to the second embodiment, since the number of camera heads is increased, the number of timings at which the relative speed between a camera head and a subject Wk is made equal to 0 (i.e., a camera head and a subject Wk become parallel with each other) can be increased. In this manner, in the camera unit 30B according to the second embodiment, the number of images taken to be transmitted to the camera control unit 50 for each subject Wk can be increased. Furthermore, since the increase in the number of images taken makes it unnecessary to capture each subject Wk in such a manner that it is included in an angle of view, it becomes possible to capture each subject Wk from a position closer to it. Still further, in the camera control unit 50 according to the second embodiment, since the resolution of an image taken of one subject Wk can be increased by adding its plural images pixel by pixel, data of an image taken can be generated in which peripheral portions are reduced in distortion.

The camera unit 30B according to the second embodiment can be applied to both of the case that the camera unit 30B performs imaging while being moved by the inspection cart 10 or the like (first embodiment) and the case that the camera unit 30B is fixed and subjects Wk are moved (first modification of the first embodiment).

In the following description of the second embodiment, constituent elements having the same ones in the first embodiment or the first modification of the first embodiment will be given the same reference symbols as the latter and will not be described in detail.

Figure 17:
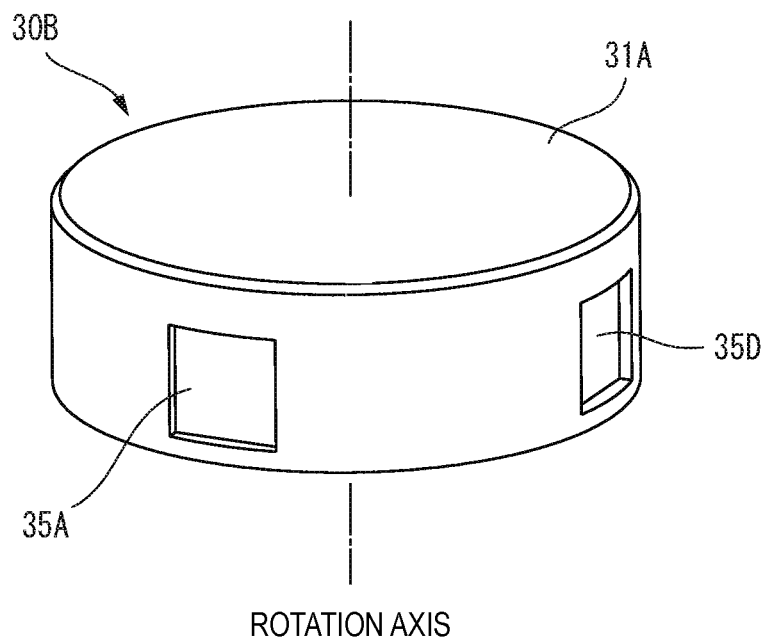
FIG. 17 is a perspective view showing an example appearance of a drum according to a second embodiment.
Figure 18:
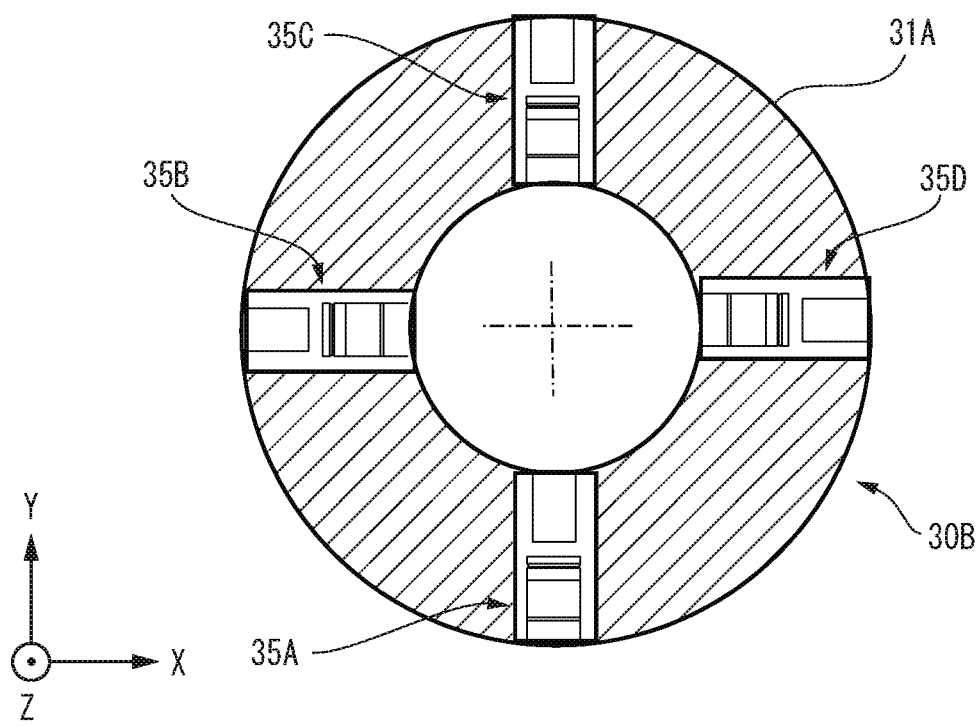
FIG. 18 is a sectional view showing an example arrangement of four camera heads provided in the drum.

The drum 31A employed in the second embodiment will be described below with reference to FIGS. 17 and 18. FIG. 17 is a perspective view showing an example appearance of the drum 31A employed in the second embodiment. FIG. 18 is a sectional view showing an example arrangement of four camera heads 35A, 35B, 35C, and 35D provided in the drum 31A. Although in this example the four camera heads 35A, 35B, 35C, and 35D are disposed in the circumferential surface of the drum 31A, it goes without saying that the number of camera heads is not limited to four and may be two or larger than two.

Four openings are formed in the circumferential surface of the drum 31A at intervals of 90°. The four openings are openings that allow the imaging elements 42 of the four camera heads 35A, 35B, 35C, and 35D to capture subjects Wk, respectively. Each of the four openings may be fitted with a transparent member. Each of the four camera heads 35A, 35B, 35C, and 35D has the same configuration as the camera head 35 employed in the first embodiment and the first modification of the first embodiment.

Figure 19:
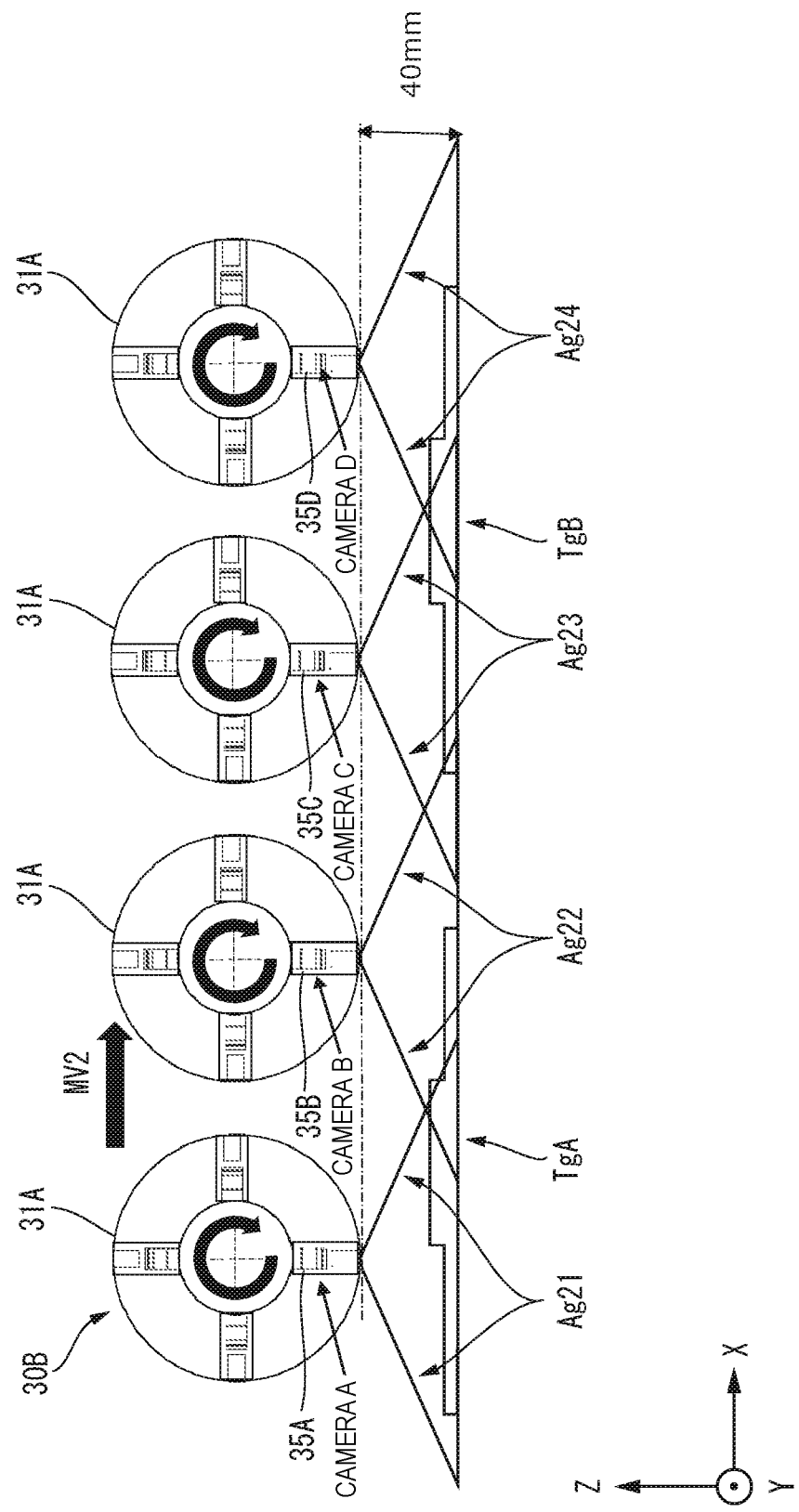
FIG. 19 is a diagram showing imaging examples captured by the four camera heads.

FIG. 19 is a diagram showing an example of how the four camera heads 35A, 35B, 35C, and 35D perform imaging. In the camera unit 30B shown in FIG. 19, each of the four camera heads 35A, 35B, 35C, and 35D captures subjects TgA and TgB as the drum 314 is moved in a direction MV2 while being rotated in a direction MM2.

The four camera heads 35A, 35B, 35C, and 35D have respective angles of view Ag21, Ag22, Ag23, and Ag24. The four camera heads 35A, 35B, 35C, and 35D capture the subjects TgA and TgB in such a manner their angles of view Ag21, Ag22, Ag23, and Ag24 overlap with each other and each of the subjects TgA and TgB is captured by plural ones of the camera heads 35A, 35B, 35C, and 35D. In the camera unit 30B shown in FIG. 19, the angle of view Ag21 of the camera head 354 and the angle of view Ag22 of the camera head 35B cover the subject TgA. The angle of view Ag22 of the camera head 35B, the angle of view Ag23 of the camera head 35C, and the angle of view Ag24 of the camera head 35D cover the subject TgB.

With the above measure, in the camera unit 30B, even if the angle of view of a camera head facing the subject side (e.g., the angle of view Ag21 of the camera head 35A) does not fully cover the subject TgA, the angle of view of the camera head that faces the subject side next (e.g., the angle of view Ag22 of the camera head 35B) also covers the subject TgA. In this manner, in the camera unit 30B, each of the plural subjects TgA and TgB can be captured in such a manner that corresponding ones of the plural camera heads 35A to 35D are brought close to it. The distance from the camera head 35 to the subject (distance to subject) is set at 40 mm, for example. The camera control unit 50 can perform pixel-by-pixel addition in peripheral portions of plural images taken of one subject because the peripheral portions can overlap with each other. As a result, the camera control unit 50 can increase the resolution of peripheral portions of each image taken.

Figure 20:
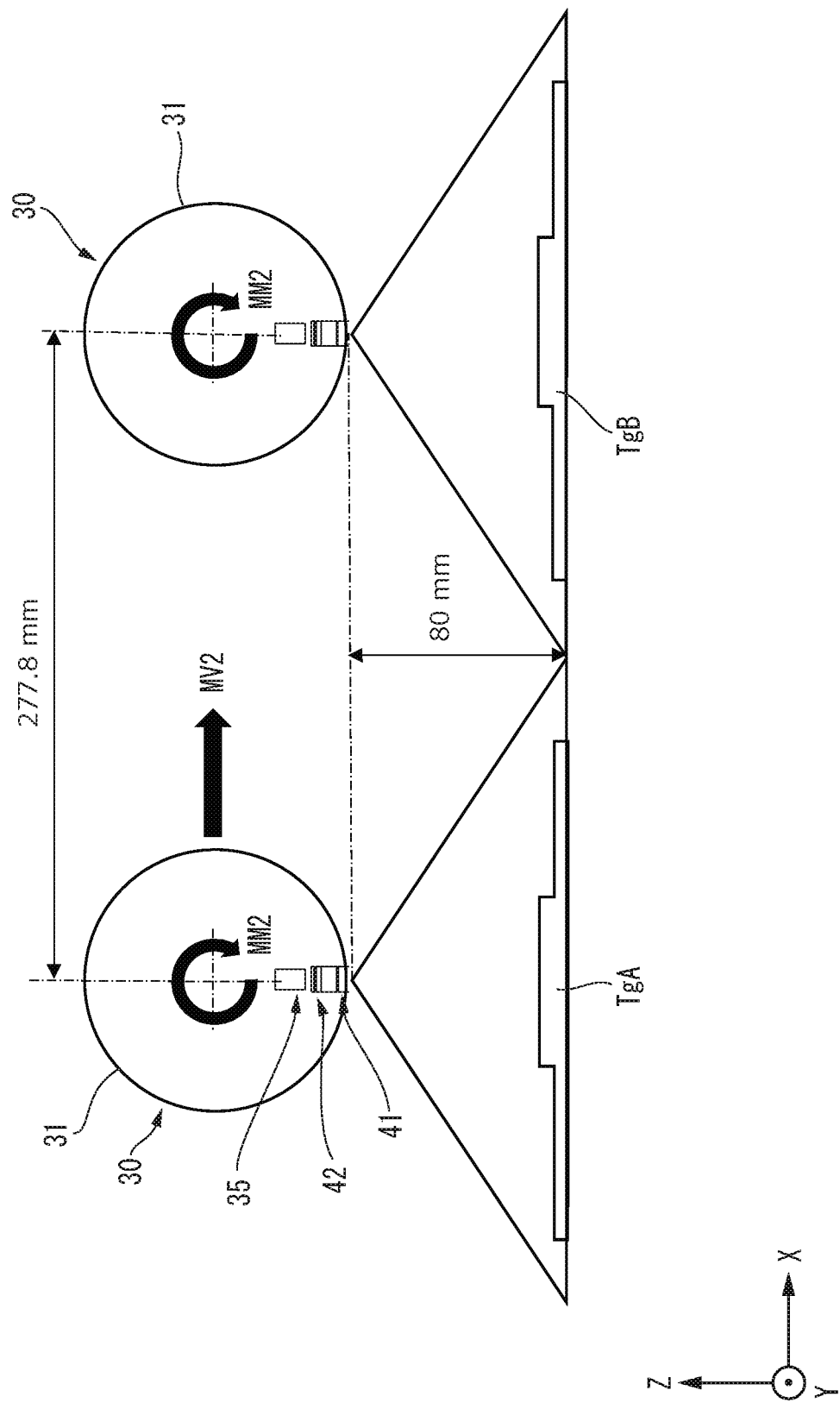
FIG. 20 is a diagram showing an imaging example captured by a single camera head.

FIG. 20 is a diagram showing an example of imaging by a single camera head 35. The camera unit 30 shown in FIG. 20 has one camera head 35 like the camera unit 30 according to the first embodiment does. In the camera unit 30 shown in FIG. 20, the camera head 35 captures each of subjects TgA and TgB as the drum 31 is moved in a direction MV2 while being rotated in a direction MM2.

As shown in FIG. 20, the camera unit 30 having the single camera head 35 should preferably capture subjects TgA and TgB in such a manner that its angle of view covers each of the subjects TgA and TgB fully, even preferably in such a manner that each of the subjects TgA and TgB is located at a central portion of the angle of view. In this case, the camera head 35 is disposed at a position that is far from the subjects Tg and captures each of the subjects TgA and TgB in such a manner that it is covered by the angle of view. For example, to allow the camera head 35 to capture each of the subjects TgA and TgB in the same manner as in the case where the four camera heads 35A to 35D are provided, the distance from the camera head 35 to each of the subjects TgA and TgB (distance to subject) needs to be set two times as long as a distance of the case that the four camera heads 35A to 35D are provided. More specifically, where the camera head 35 performs high-speed imaging under conditions that the frame rate is 120 (fps), the diagonal angle of view is 120°, and the movement speed is 100 km/h, an imaging interval to the next frame is equal to 277.8 mm. Thus, a distance of about 80 mm is necessary between the camera head 35 and each of the subjects TgA and TgB.

On the other hand, in the camera unit 30B according to the second embodiment, the four camera heads 35A to 35D are disposed in the peripheral surface of the drum 31A at intervals of 90°. Thus, each of the four camera heads 35A to 35D can capture each subject Tg from a closer position. As a result, in performing high-speed imaging on each subject Tg, the resolution of an image taken by the camera unit 30B according to the second embodiment can be made higher. Furthermore, in the camera unit 30B according to the second embodiment, imaging is performed so that peripheral portions of images taken overlap with each other and pixel-by-pixel addition is performed in the overlap, whereby distortion of the images can be suppressed and the peripheral portions of the images can be increased in resolution.

First Modification of Second Embodiment

Figure 21:
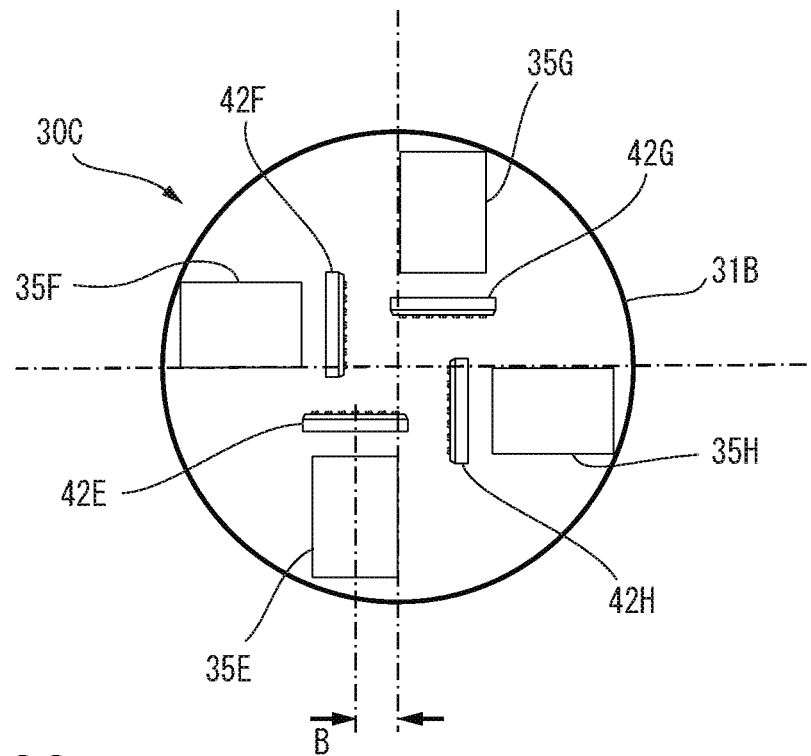
FIG. 21 is a diagram showing an example internal configuration of a camera unit according to a first modification of the second embodiment.

FIG. 21 is a diagram showing an example internal configuration of a camera unit 30C according to a first modification of the second embodiment. In the camera unit 30C, four openings are formed in the peripheral surface of a drum 31B. Each of the four openings is formed at a position that is deviated by a distance B from one of two lines (indicated by chain lines in FIG. 21) that divide the camera unit 30C into four equal parts. Four camera heads 35E, 35F, 35G, and 35H are disposed like the blades of a windmill at positions that are deviated by a distance B from the two lines that divide the camera unit 30C into four equal parts. With this structure, the four camera heads 35E to 35H and four imaging elements 42E, 42F, 42G, and 42H can be located at positions that are closer to the rotation axis of the camera unit 30C than in the camera unit 30B shown in FIG. 18 having the four camera heads 35A to 35D.

As a result, the size (diameter) of the camera unit 30C according to the first modification of the second embodiment can be made smaller. Furthermore, in the camera unit 30C, since the four camera heads 35E to 35H are deviated by the distance B from the above two lines passing through the rotation axis, the degree of distortion in peripheral portions of each image taken can be lowered (refer to paragraph 0053).

Second Modification of Second Embodiment

Figure 22:
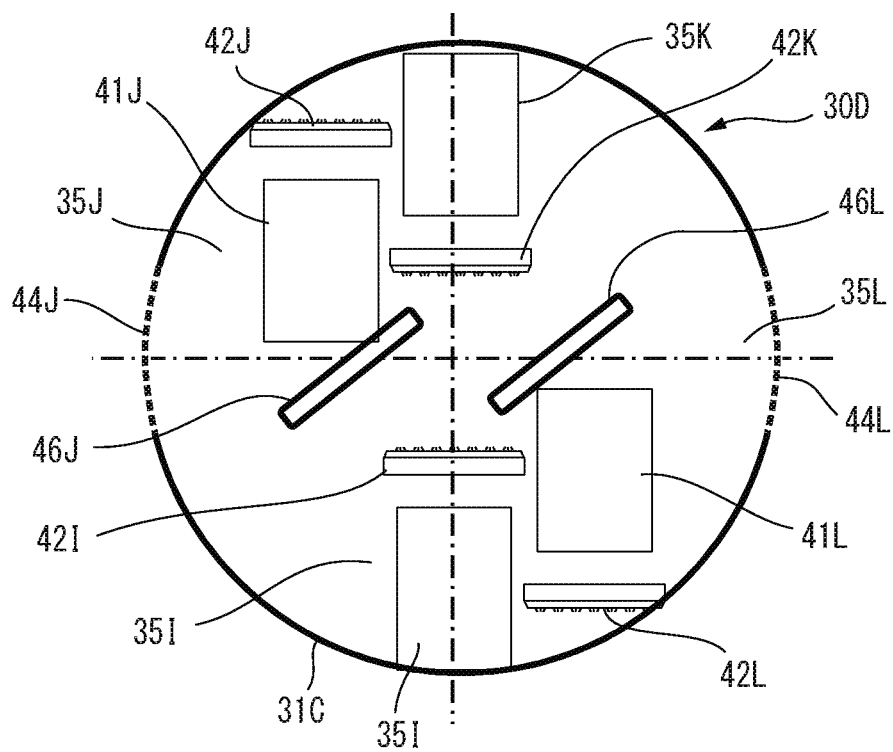
FIG. 22 is a diagram showing an example internal configuration of a camera unit according to a second modification of the second embodiment.

FIG. 22 is a diagram showing an example internal configuration of a camera unit 30D according to a second modification of the second embodiment. In the camera unit 30D, four openings are formed in the peripheral surface of a drum 31C at intervals of an angle 90°. Two camera heads 35I and 35K are disposed in such a manner that they are opposed to each other and their center lines coincide with one of two lines that divide the camera unit 30D into four equal parts. Likewise, two imaging units 42I and 42K are disposed in such a manner that they are opposed to each other and their center lines coincide with the one of the two lines that divide the camera unit 30D into four equal parts. A camera head 35J and an imaging element 42J are arranged parallel with and directed oppositely to the camera head 35K and the imaging element 42K. A camera head 35L and an imaging element 42L are arranged parallel with and directed oppositely to the camera head 35I and the imaging element 42I.

The camera head 35J has an imaging lens 41J for focusing light reflected by a mirror 46J which reflects light coming from an opening 44J by 90° and the imaging element 42J for converting an optical image formed by the imaging lens 41J into an image signal. Likewise, the camera head 35L has an imaging lens 41L for focusing light reflected by a mirror 46L which reflects light coming from an opening 44L by 90° and the imaging element 42L for converting an optical image formed by the imaging lens 41L into an image signal. Each of the four openings may be fitted with a transparent member.

In the camera unit 30D according to the second modification of the second embodiment, the optical axes of the four imaging elements 42I to 42L are arranged parallel with each other because of the intervention of the two mirrors 46J and 46L. With this measure, in camera unit 30D according to the second modification of the second embodiment, the four camera heads 35I to 35L can be disposed closer to the rotation axis of the camera unit 30D than the four camera heads 35A to 35D of the camera unit 30B shown in FIG. 18 are to its rotation axis.

Where a camera unit is equipped with mirrors, an improvement may be made so that the number of images is increased that are taken with a subject located at the center of the angle of view of imaging by rotating each mirror by a very small angle according to a rotation speed of the camera unit and thereby changing the center line of imaging in which the subject is located right in front of the camera head. Each mirror provided in a camera unit is not limited to a planar mirror; for example, a prism may be provided instead of the planar mirror to enable selection of an input wavelength.

As such, the size (diameter) of the camera unit 30D according to the second modification of the second embodiment can be made smaller.

Third Modification of Second Embodiment

Figure 23:
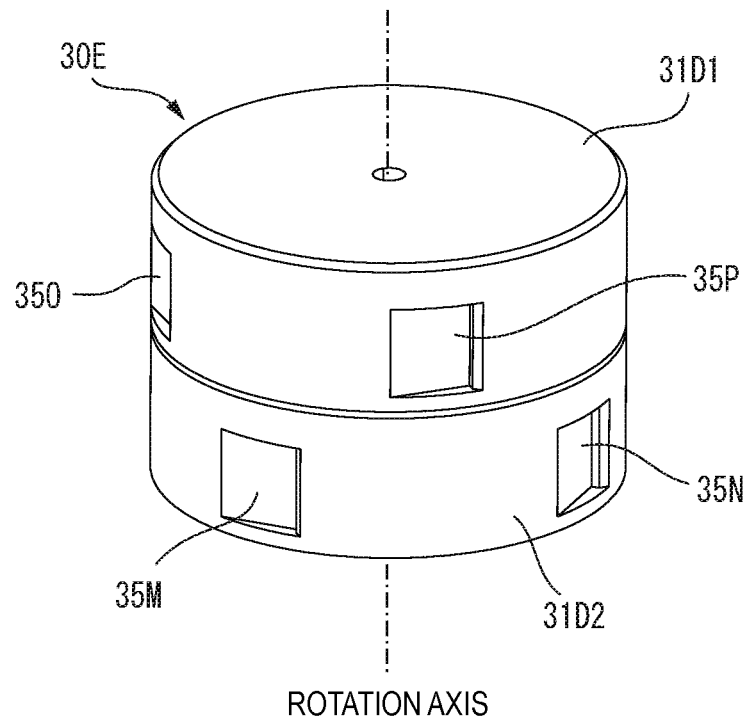
FIG. 23 is a diagram showing an example internal configuration of a camera unit according to a third modification of the second embodiment.

FIG. 23 is a diagram showing an example internal configuration of a camera unit 30E according to a third modification of the second embodiment. The camera unit 30E is equipped with two drums 31D1 and 31D2 and is thus about two times as thick as in the case where the drum 31 or 31B is employed.

In the drum 31D1, four camera heads 35M, 35N, . . . are formed in its circumferential surface at the same intervals. In the drum 31D2, four camera heads 35O, 35P, are formed in its circumferential surface at the same intervals. The four camera heads 35M, 35N, . . . and the four camera heads 35O, 35P, . . . are deviated so as not to be located at the same positions in the circumferential direction of the drums 31D1 and 31D2 (i.e., in the rotation direction of the camera unit 30E).

Although in the example shown in FIG. 23 the four camera heads 35M, 35N, . . . are deviated from the four respective camera heads 35O, 35P, by 45° (staggered arrangement), the manner of deviation is not limited to this; the camera heads 35M, 35N, . . . may be deviated from the respective camera heads 35O, 35P, . . . by 20° or 30°. The number of camera heads provided in each of the drums 31D1 and 31D2 is not limited to four and may be two, for example. Furthermore, the numbers of camera heads provided in the respective drums 31D1 and 31D2 need not always be identical.

As described above, in the camera unit 30E according to the third modification of the second embodiment, since the camera heads are arranged in two levels, the number of camera heads can be increased without increasing the diameter of the camera unit 30E. In the camera unit 30E according to the third modification of the second embodiment, the degree of freedom of arrangement of camera units can be increased. Thus, the camera unit 30E can capture subjects reliably by virtue of an increased number of camera heads even in the case where the camera heads capture the subjects while the camera unit 30E is moving or rotating at high speed. Furthermore, in the camera unit 30E, the number of images taken by plural respective camera heads can be increased and, at the same time, the number of overlaps between the ranges of angles of view can be increased. As a result, the camera control unit 50 can increase the resolution of peripheral portions of each image corresponding to peripheral portions of the range of each angle of view by performing addition on a pixel-by-pixel basis.

Fourth Modification of Second Embodiment

Figure 24:
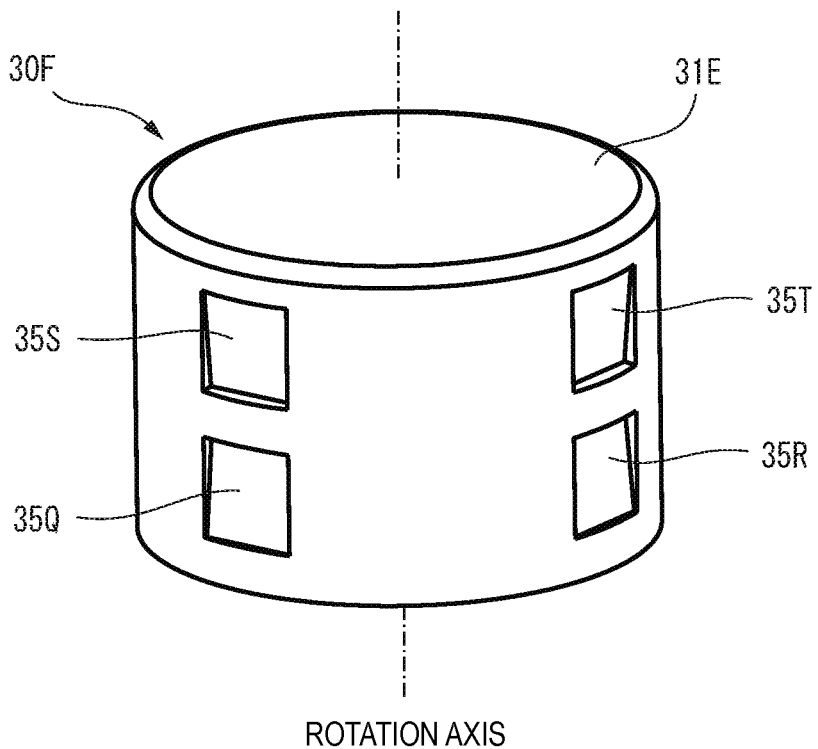
FIG. 24 is a diagram showing an example internal configuration of a camera unit according to a fourth modification of the second embodiment.

FIG. 24 is a diagram showing an example internal configuration of a camera unit 30F according to a fourth modification of the second embodiment. As in the camera unit 30E according to the third modification of the second embodiment, a drum 31E of the camera unit 30F according to the fourth modification of the second embodiment is about two times as thick as the drums 31 and 31B. In the camera unit 30F, four camera heads 35Q, 35R, . . . are formed in a lower part of the circumferential surface of the drum 31E and four camera heads 35S, 35T, . . . are formed in an upper part of the circumferential surface of the drum 31E. The four camera heads 35Q, 35R, . . . and the four camera heads 35S, 35T, . . . are formed at the same positions in the circumferential direction (i.e., the rotation direction of the camera unit 30F), respectively.

As described above, in the camera unit 30F according to the fourth modification of the second embodiment, since the camera heads are arranged in two levels, the number of camera heads can be increased without increasing the diameter of the camera unit 30F. In the camera unit 30F according to the fourth modification of the second embodiment, the degree of freedom of arrangement of camera units can be increased. Thus, the camera unit 30F can capture subjects reliably by virtue of an increased number of camera heads even in the case where the camera heads capture the subjects while the camera unit 30F is moving or rotating at high speed. Furthermore, in the camera unit 30F, the number of images taken by plural respective camera heads can be increased and, at the same time, the number of overlaps between the ranges of angles of view can be increased. As a result, the camera control unit 50 can increase the resolution of peripheral portions of each image corresponding to peripheral portions of the range of each angle of view by performing addition on a pixel-by-pixel basis.

Third Embodiment

In the first and second embodiments, the camera heads are disposed in the peripheral surface of the drum. In a third embodiment, a camera head is disposed in a side surface of the drum. The third embodiment is directed to a case that the camera head captures a subject while being moved. In the following description of the camera device according to the third embodiment, constituent elements having the same ones in the first or second embodiment will be given the same reference symbols as the latter and will not be described in detail.

Figure 25:
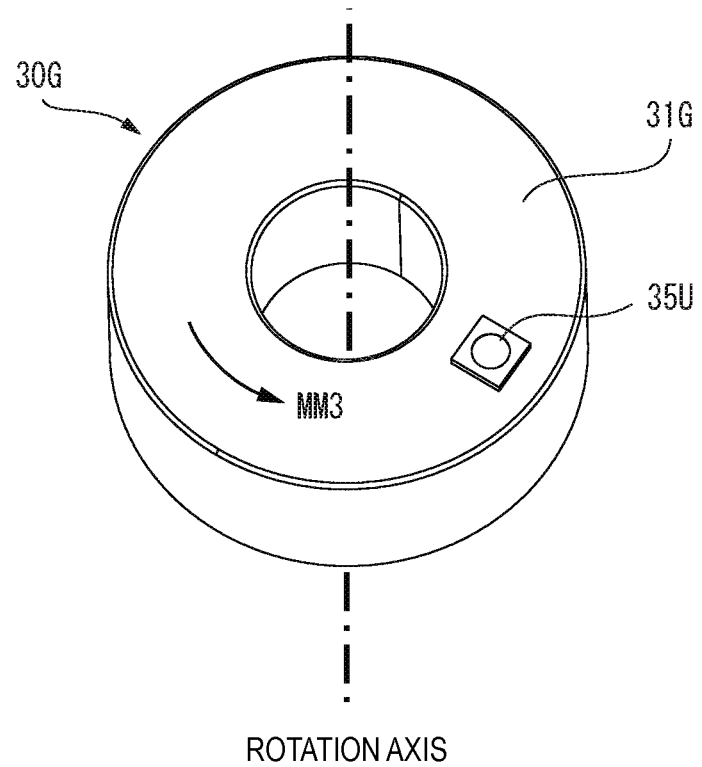
FIG. 25 is a perspective view showing an example appearance of a camera unit according to a third embodiment.

FIG. 25 is a perspective view showing an example appearance of the camera unit 30G according to the third embodiment. In the camera unit 30G according to the third embodiment, a camera head 35U is disposed in an opening formed in a side surface of a ring-shaped drum 31G. The optical axis of the camera head 35U is parallel with the rotation axis of the drum 31G. The camera head 35U is rotated in a direction MM3 around the rotation axis.

Figure 26:
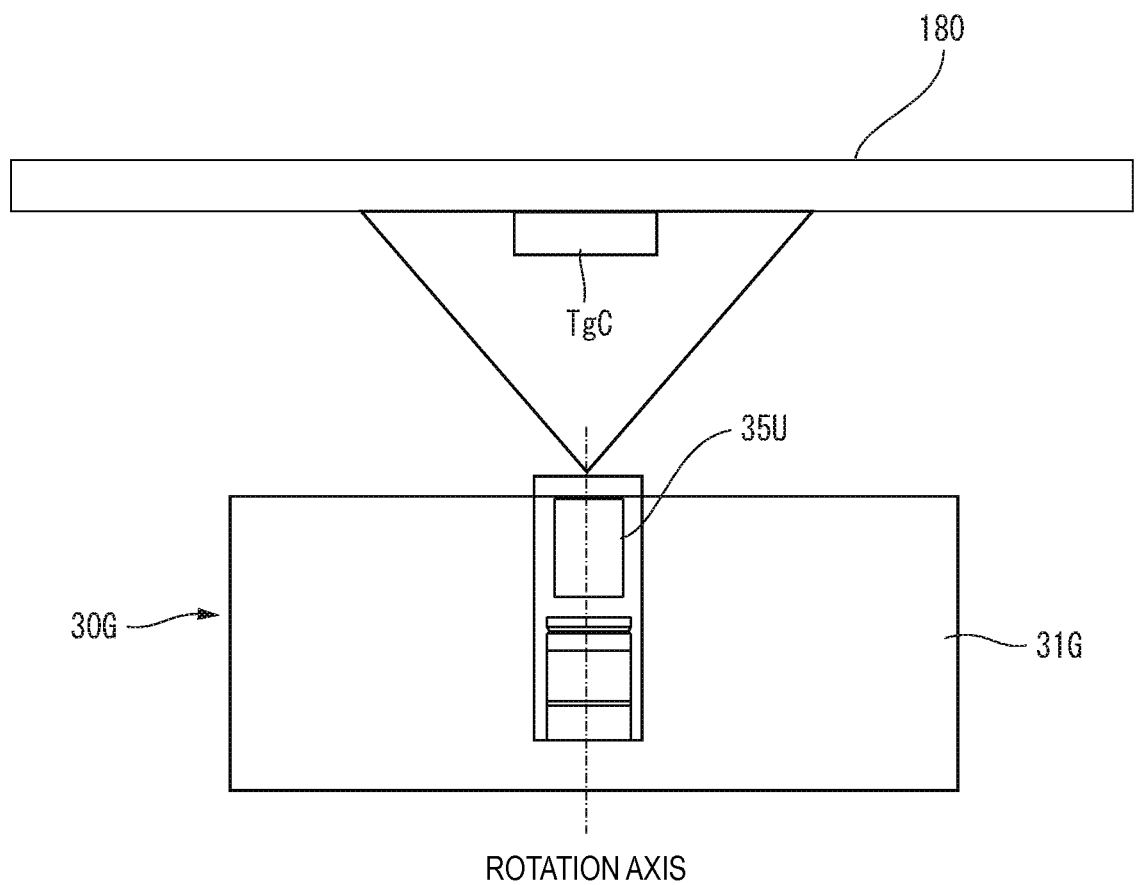
FIG. 26 is a view showing an example of imaging by the camera unit according to the third embodiment.

FIG. 26 is a view showing an example manner of imaging by the camera unit 30G. A subject TgC is suspended on a rail 180. The camera unit 30G is disposed under the rail 180 and captures the subject TgC from under the subject TgC as the camera unit 30G is moved at a prescribed speed in a direction MV3 alongside the rail 180 while being rotated in the direction MM3 of the drum 31G. The camera head 35U is rotated around the rotation axis of the drum 31G. Although the camera unit 30G shown in FIG. 26 is moved by an inspection cart 10, the inspection cart 10 is omitted in FIG. 26 to simplify the description. Where the subject TgC is moved, it may be conveyed by the rail 180 serving as part of a conveying machine.

The positional relationship between the camera unit 30G and the subject TgC may be opposite to that shown in FIG. 26. That is, the camera unit 30G may be suspended on the rail 180 and capture the subject TgC disposed under the camera unit 30G.

Figure 27:
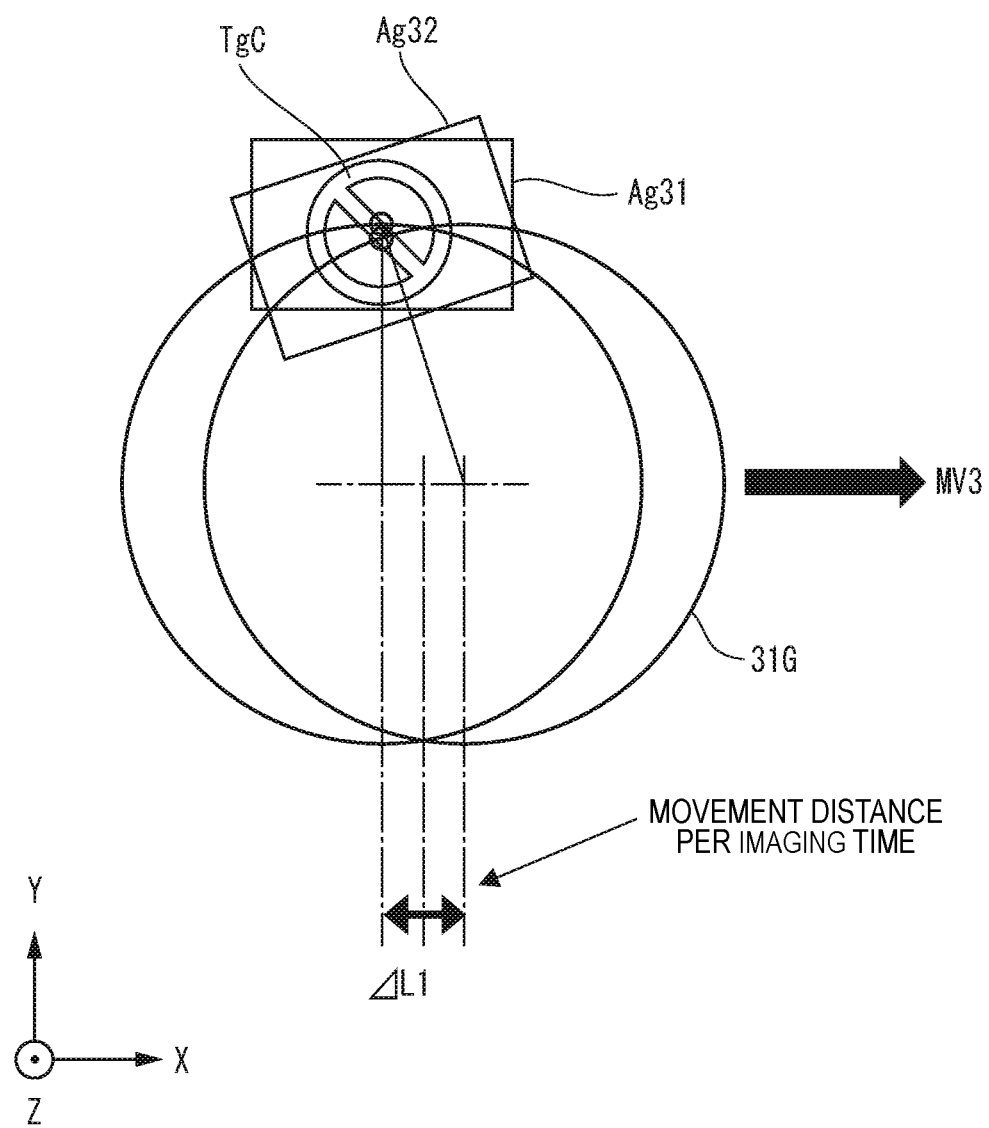
FIG. 27 is a diagram showing an example of how the camera unit according to the third embodiment captures a subject.

FIG. 27 is a diagram showing an example of how the camera unit 30G according to the third embodiment captures the subject TgC. The drum 31G shown in FIG. 27 is moved in the direction MV3. The camera unit 30G according to the third embodiment transmits, to the camera control unit 50, an image of the subject TgC that was taken while being moved in the X direction by a movement distance $\Delta L1$.

The camera head 35U employed in the third embodiment is moved while being rotated so as to form, with respect to the subject TgC, a trace that is shaped like a cycloid curve. That is, the subject TgC is captured so that its locus in plural images taken with respective view ranges likewise becomes a cycloid curve. FIG. 27 shows a view range Ag31 of the camera head 35U and a corresponding position of the subject TgC at timing of a start of exposure as well as a view range Ag32 of the camera head 35U and the corresponding position of the subject TgC at timing of an end of the exposure.

At the timing of the start of exposure, the relative speed between the X component of the rotation speed of the camera head 35U and the movement speed of the camera head 35U is made equal to zero. The time during which the relative speed between the camera head 35U and the subject TgC is kept equal to 0 is long because the camera head 35U is disposed so that its optical axis is parallel with the rotation axis of the drum 31G and hence the position variation of the subject TgC moving relative to the view range is made smaller.

As a result, the camera unit 30G according to the third embodiment can capture the subject TgC for a longer time. That is, the camera control unit 50 employed in the third embodiment can receive more images for the single subject TgC and the variation of the position of the single subject TgC with respect to the center of a view range is made smaller. Thus, the camera control unit 50 can generate data of clearer images taken. Furthermore, capable of receiving many images taken that are suitable for addition for image quality improvement, the resolution corresponding to a peripheral portion of a view range can be made higher.

Embodiment 4

In a fourth embodiment, a camera head 35W is disposed in the circumferential surface of a drum 31H and performs imaging being always directed to one direction (i.e., the direction of a subject TgD) while the drum 31H is moved (rotation is caused in the drum 31H). In the following description of a camera unit 34H according to the fourth embodiment, constituent elements having the same ones in the control unit 30 or 30A according to the first embodiment will be given the same reference symbols as the latter and will not be described in detail.

Figure 28:
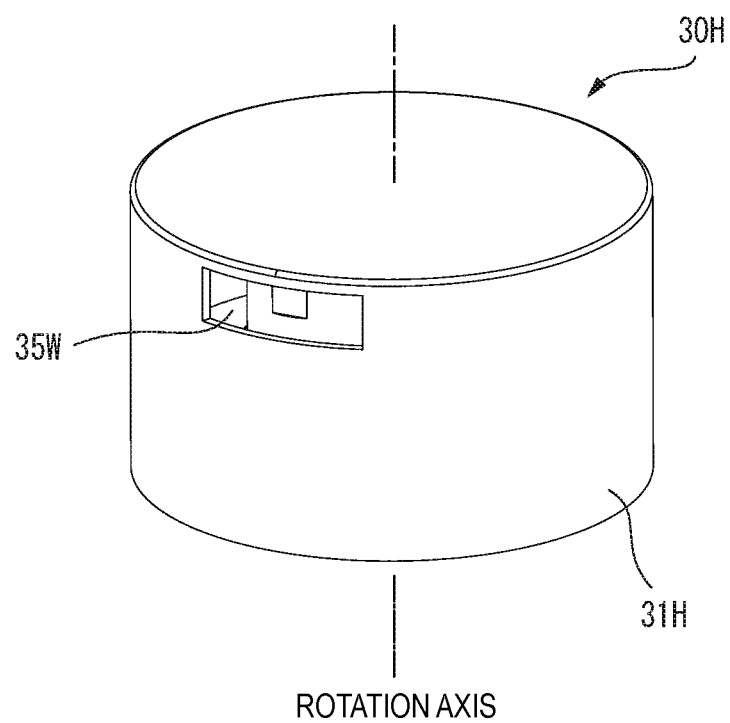
FIG. 28 is a perspective view showing an example appearance of a camera unit according to a fourth embodiment.

FIG. 28 is a perspective view showing an example appearance of the camera unit 34H according to the fourth embodiment. The camera unit 34H has a drum 31H which is thicker than the drum 31 employed in the first embodiment. The circumferential surface of the drum 31H is formed with an opening that allows a camera head 35W to capture a subject TgD.

Figure 29:
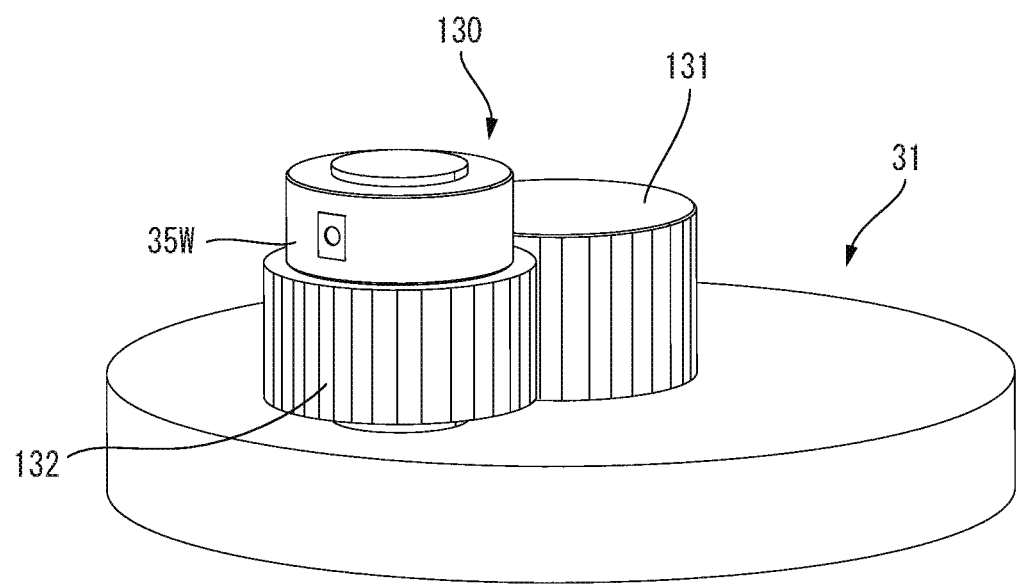
FIG. 29 is a perspective view showing an example internal mechanism of a drum of the camera unit according to the fourth embodiment.
Figure 30:
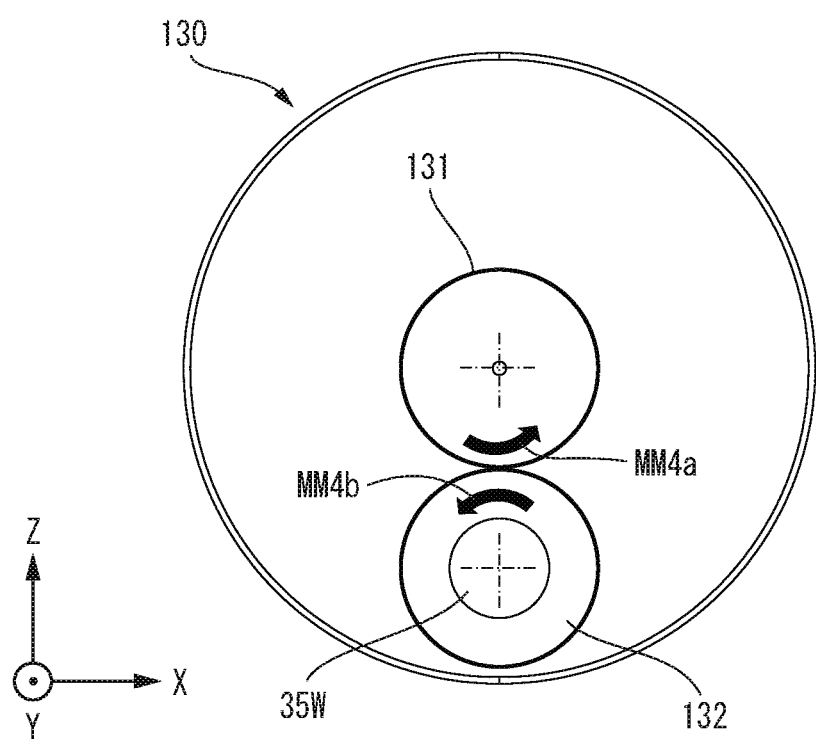
FIG. 30 is a diagram showing an example operation of a first gear and a second gear.

FIG. 29 is a perspective view showing an example internal mechanism of the drum 31H. FIG. 30 is a diagram showing an example operation of a first gear 131 and a second gear 132. The drum 31H is equipped with a gear mechanism 130 which has the first gear 131 and the second gear 132.

The first gear 131 is supported pivotally by a rotary motor 37, for example, and is driven rotationally in a direction MM4a at a rotation speed R. The first gear 131 is in mesh with the second gear 132 with a speed reduction ratio 1 and transmits rotational power to the second gear 132.

The second gear 132 supports the camera head 35W pivotally. The second gear 132 is rotated in a direction MM4b by the rotational power transmitted from the first gear 131 (speed reduction ratio: 1). That is, the second gear 132 is in mesh with the first gear 131 and rotates on its axis while circling around the first gear 131. Thus, the camera head 35W which is supported by the second gear 132 pivotally can perform imaging in such a manner as to be always directed in the same direction (−Z direction in FIG. 30).

Figure 31:
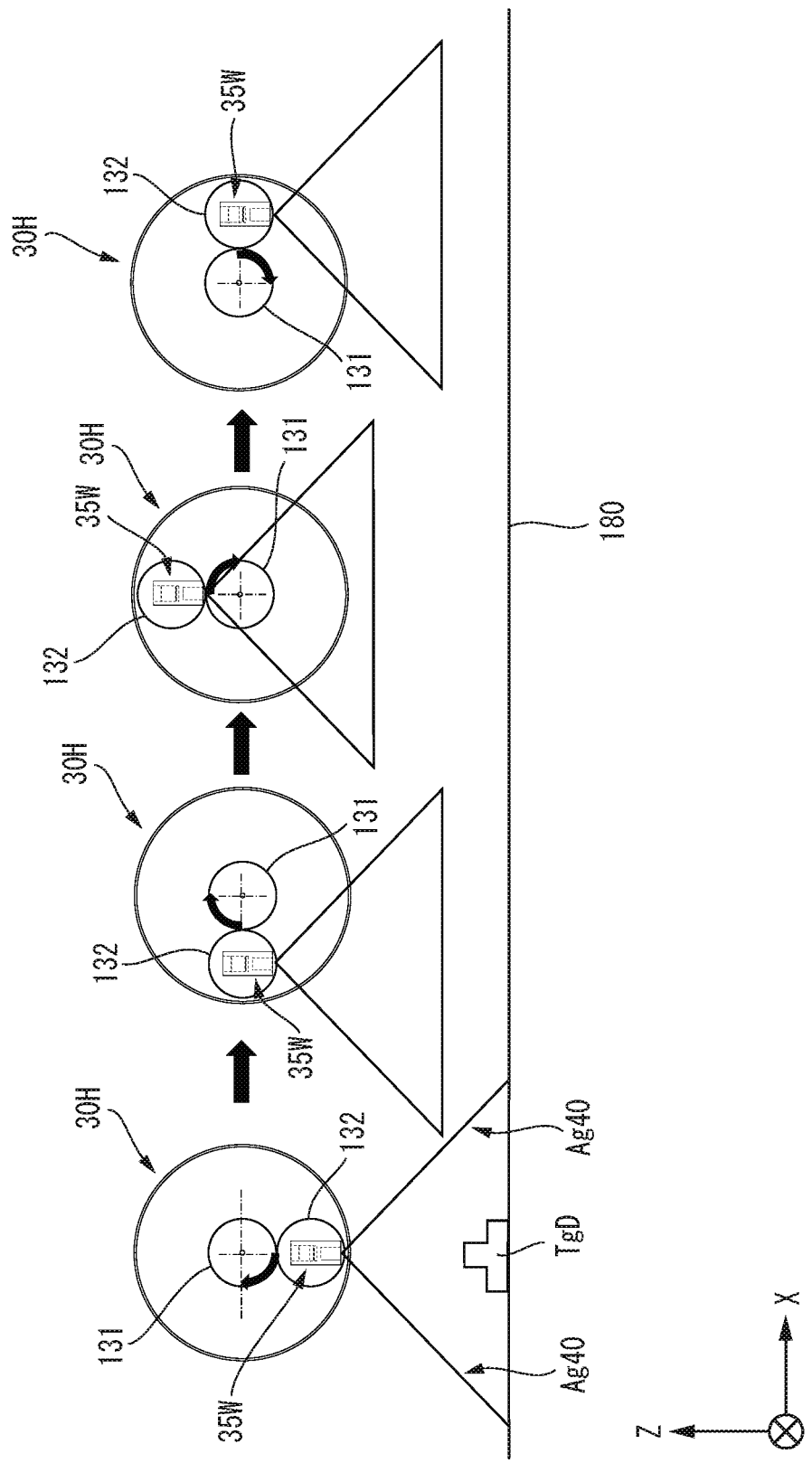
FIG. 31 is a diagram showing an example of how a subject is captured by the camera unit according to the fourth embodiment.

FIG. 31 is a diagram showing an example of how a subject TgD is captured by the camera unit 30H according to the fourth embodiment. As described above with reference to FIGS. 29 and 30, the camera head 35W and its angle of view Ag40 are always directed toward the subject TgD (i.e., in the −Z direction).

The camera head 35W according to the fourth embodiment is controlled by the camera control unit 50 in such a manner that rotation is caused in the drum 31H at a rotation speed that makes approximately equal to 0 the relative speed between a movement speed (in the X direction) of the subject TgD and a movement speed of the camera head 35W at a position where the distance between the camera head 35W and the subject TgD is smallest. With this measure, the camera head 35W can capture the subject TgD by starting exposure at such timing that the distance to the subject TgD becomes smallest (i.e., the imaging distance to the subject TgD becomes smallest).

Figure 32:
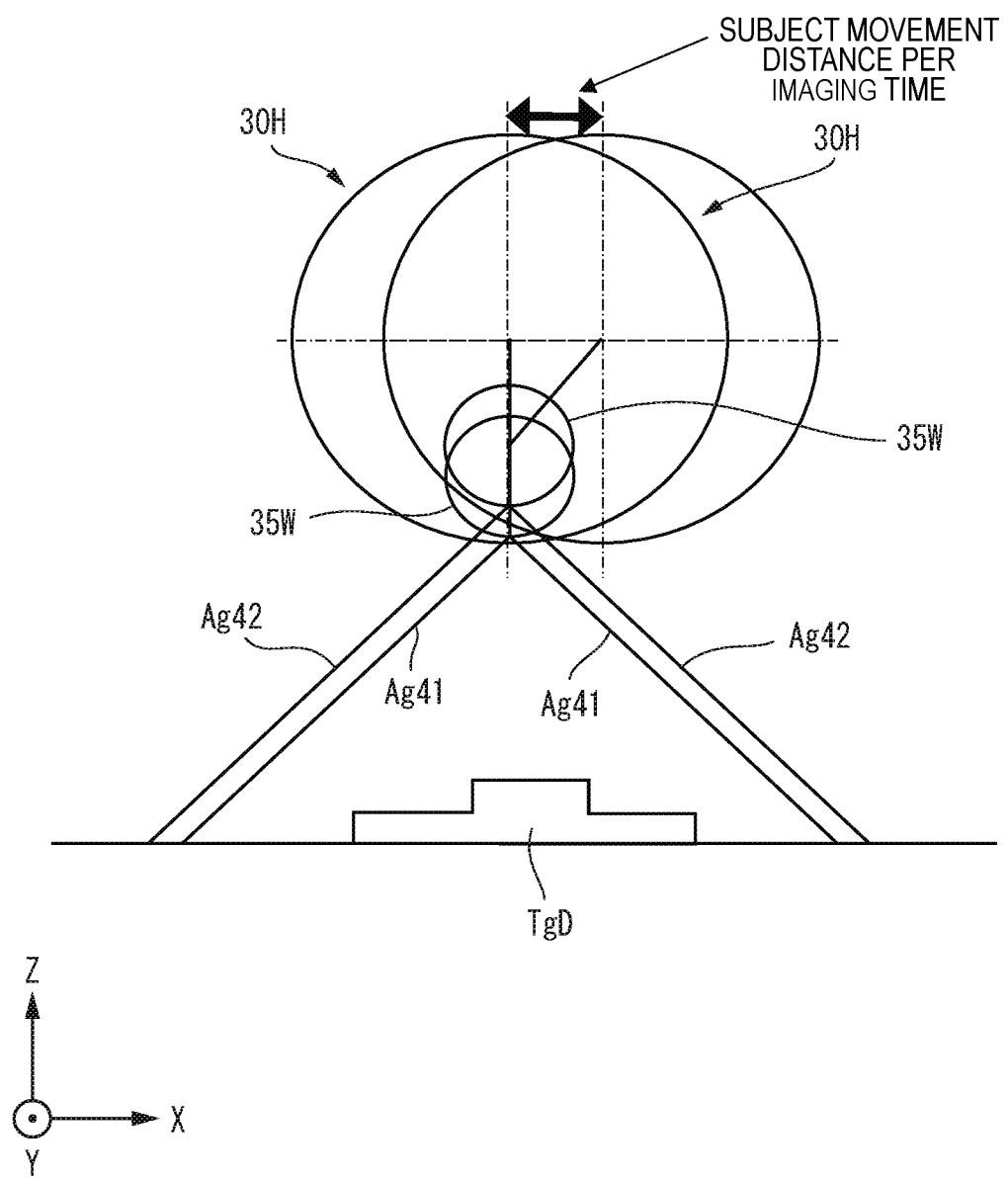
FIG. 32 is another diagram showing the example of how the subject is captured by the camera unit according to the fourth embodiment.

FIG. 32 is another diagram showing an example of how the subject TgD is captured by the camera unit 30H according to the fourth embodiment. The camera unit 30H is moved in a direction MV4. The camera head 35W employed in the fourth embodiment starts exposure from a position where the distance between the camera head 35W and the subject TgD is smallest (in other words, starts transmission of an image taken to the camera control unit 50). An angle of view Ag42 of the camera head 35W at timing when the relative speed between the camera head 35W and the subject TgD can be regarded as being equal to 0 is made larger than an angle of view Ag41 at timing when the relative speed between the camera head 35W and the subject TgD is equal to 0 according to a movement distance of the camera head 35W in the Z direction per an imaging time of the camera head 35W.

As described above, in the camera unit 30H according to the fourth embodiment, since the camera head 35W performs imaging being always directed toward the subject TgD, the variation, from the center of the angle of view, of the position of the subject TgD in each of plural images taken that are transmitted to the camera control unit 50 is much smaller than in the other embodiments. As a result, in the camera unit 30H according to the fourth embodiment, the deviation of the imaging position of the subject TgD of each of plural images taken that are transmitted to the camera control unit 50 can be made small and data of images taken that are high in resolution in peripheral portions of an angle of view can be generated by performing pixel-by-pixel addition using many images. Furthermore, by performing pixel-by-pixel addition, the camera control unit 50 can suppress distortion of an image due to a difference in distance between a peripheral portion of a subject-side view range and a peripheral portion of a camera-side view range that occurs when the subject TgD is captured obliquely.

Fifth Embodiment

In the above-described camera units according to the first to fourth embodiments, a subject can be captured by making the relative speed between the camera head and a subject approximately equal to 0 by rotating the drum (or causing rotation in the drum). In a camera unit according to a fifth embodiment to be described below, a piston mechanism is provided and a subject is captured in such a manner that the relative speed between the camera head and the subject is made approximately equal to 0 by driving the piston mechanism.

In the following description of the camera unit according to the fifth embodiment, constituent elements having the same ones in the third embodiment will be given the same reference symbols as the latter and will not be described in detail. The camera unit 30J according to the fifth embodiment can be applied to not only a case of a moving subject TgE but also a case that the camera unit 30J performs imaging while being moved.

Figure 33:
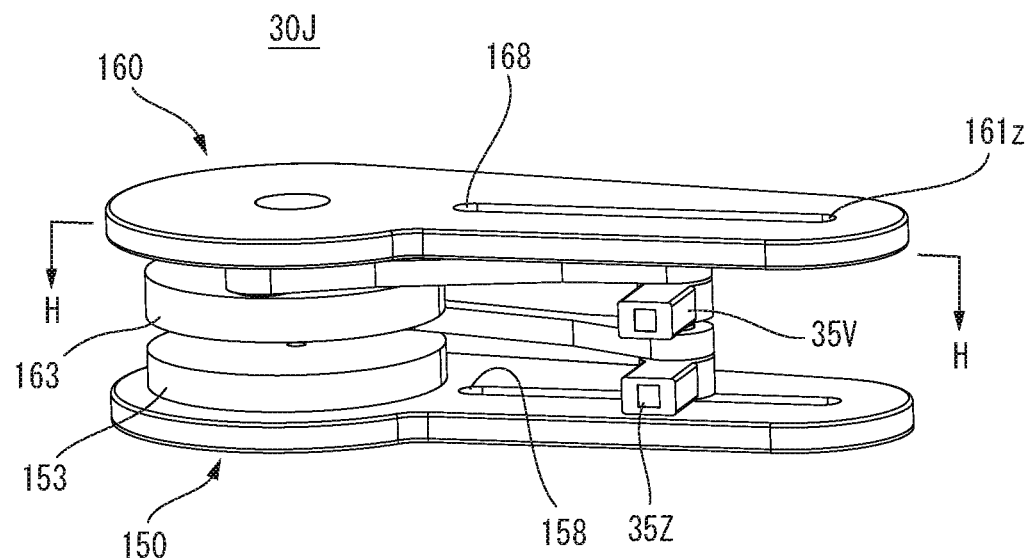
FIG. 33 is a perspective view showing an example appearance of a camera according to a fifth embodiment.
Figure 34:
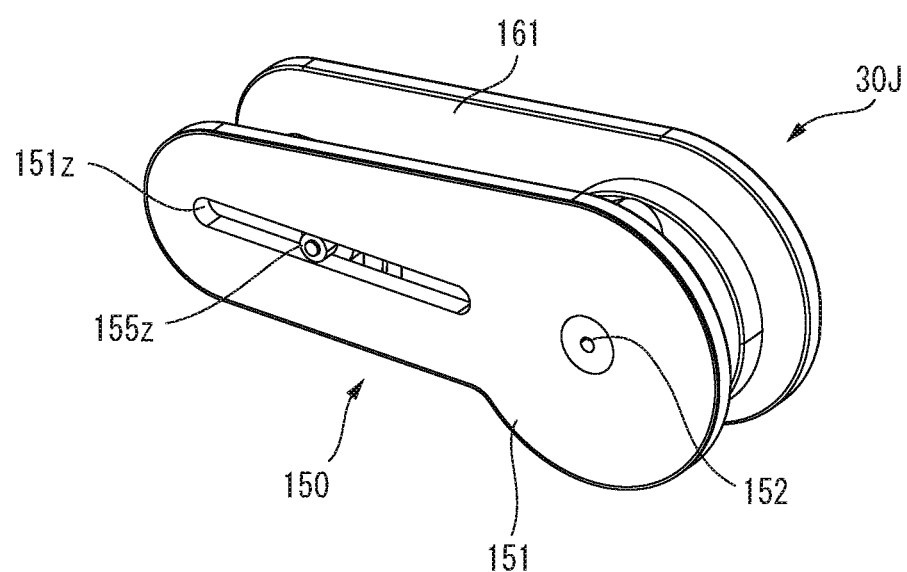
FIG. 34 is a perspective view showing an example appearance of the camera unit as viewed from obliquely below in FIG. 33.
Figure 35:
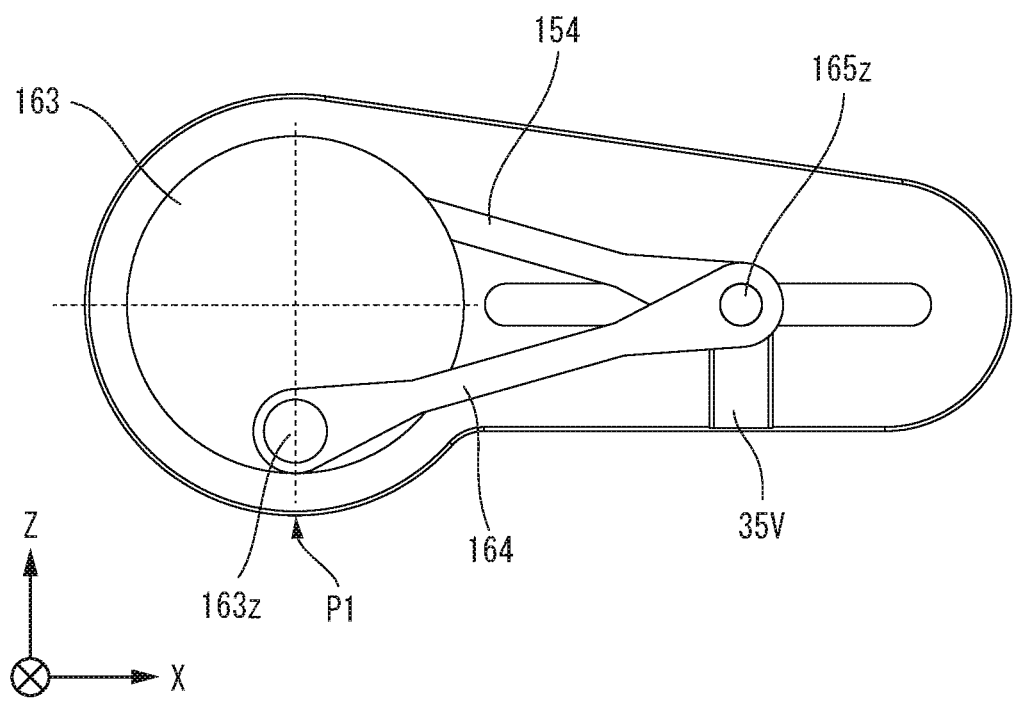
FIG. 35 is a front view showing an example drive mechanism of the camera unit as viewed from an arrowed line H-H in FIG. 33.
Figure 36:
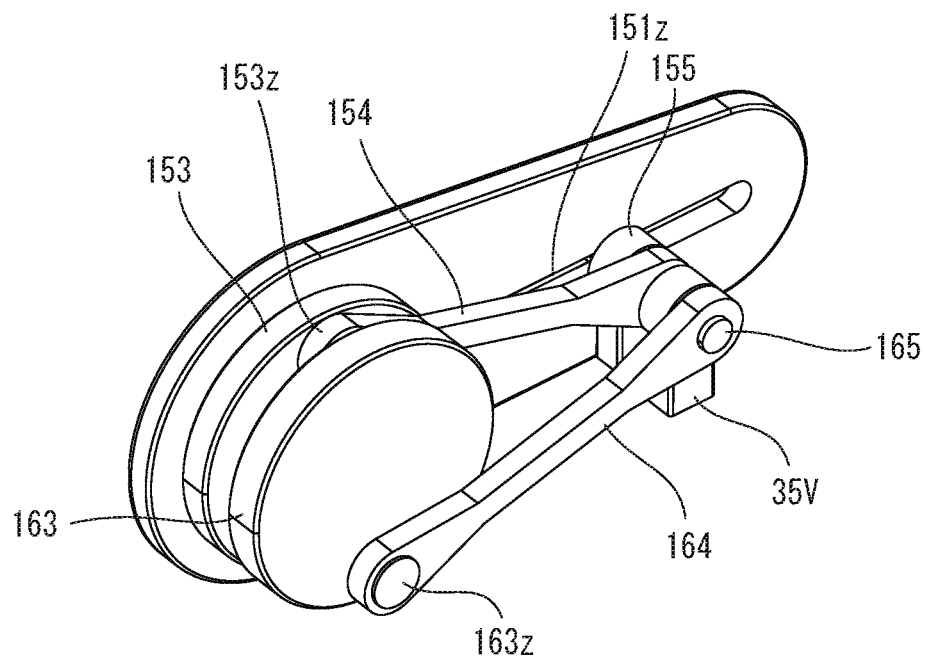
FIG. 36 is a perspective view showing the example drive mechanism of the camera unit as viewed from the arrowed line H-H in FIG. 33.

The configuration and a moving mechanism of the camera unit 30J according to the fifth embodiment with reference to FIGS. 33 to 36. FIG. 33 is a perspective view showing an example appearance of the camera unit 30J according to the fifth embodiment. FIG. 34 is a perspective view showing an example appearance of the camera unit 30J as viewed from below in FIG. 33. FIG. 35 is a front view showing an example drive mechanism of the camera unit 30J as viewed from an arrowed line H-H in FIG. 33. FIG. 36 is a perspective view showing the example drive mechanism of the camera unit 30J as viewed from the arrowed line H-H in FIG. 33.

The camera unit 30J is configured so as to have two guide plates 151 and 161, a drive shaft 152, two cams 153 and 163, two connecting rods 154, and 164, two bearings 155z and 165z, two sensors 158 and 168, and two camera heads 35Z and 35V. In the camera unit 30J, rotational drive power of a rotary motor 37 is transmitted to the two cams 153 and 163 by the drive shaft 152 to rotate them. Rotational drive power of the two cams 153 and 163 is transmitted to the two connecting rods 154, and 164, whereby the two camera heads 35Z and 35V which are provided on the side of one end portions of the connecting rods 154, and 164 are reciprocated, respectively. That is, the camera unit 30J is equipped with a piston mechanism 150 for reciprocating the camera head 35Z and a piston mechanism 160 for reciprocating the camera head 35V. The two piston mechanisms 150 and 160 are disposed adjacent to each other.

The piston mechanism 150 has the guide plate 151 which is approximately shaped like an ellipse. A hole 151z is formed through the guide plate 151 so as to extend in its longitudinal direction. The piston mechanism 160 has the guide plate 161 which is approximately shaped like an ellipse. A hole 161z is formed through the guide plate 161 so as to extend in its longitudinal direction.

Two circular-disc-shaped cams 153 and 163 facing the confronting surfaces of the guide plates 151 and 161 are supported rotatably by the guide plates 151 and 161, respectively.

Rotational drive power of a rotary motor (not shown) is transmitted to the drive shaft 152, whereby the two cams 153 and 163 which are connected to the drive shaft 152 are rotated. The cam 153 is provided with, at one point in the circumferential direction, an engagement portion 153z that is engaged with the other end portion of the connecting rod 154. The cam 163 is provided with, at one point in the circumferential direction, an engagement portion 163z that is engaged with the other end portion of the connecting rod 164.

The one end portion of the connecting rod 154 is provided with a head portion 155, and the one end portion of the connecting rod 164 is provided with a head portion 165.

The head portion 155 has the bearing 155z that is inserted slidably in the longitudinal hole 151z of the guide plate 151. Likewise, the head portion 165 has the bearing 165z that is inserted slidably in the longitudinal hole 161z of the guide plate 161. The camera heads 35Z and 35V are attached to the respective head portions 155 and 165.

In the piston mechanism 150, when the drive shaft 152 is rotated being driven rotationally by the rotary motor, rotational drive power of the rotary motor is transmitted to the cam 153, whereby the cam 153 is rotated. The connecting rod 154 which is connected to the engagement portion 153z of the cam 153 advances and retreats in the X direction as the cam 153 is rotated. The camera head 35Z which is attached to the head portion 155 which is moved in link with the connecting rod 154 advances and retreats in the X direction as the cam 153 is rotated. The sensor 158 capable of detecting an imaging start position (i.e., exposure start timing) is provided at the cam-153-side end of the longitudinal hole 151z. A Hall element or a proximity switch, for example, is used as the sensor 158 and detects approach of, for example, a magnet attached to the end portion of the connecting rod 154.

Likewise, the piston mechanism 160, when the drive shaft 152 is rotated being driven rotationally by the rotary motor, rotational drive power of the rotary motor is transmitted to the cam 163, whereby the cam 163 is rotated. The connecting rod 164 which is connected to the engagement portion 163z of the cam 163 advances and retreats in the X direction as the cam 163 is rotated. The camera head 35V which is attached to the head portion 165 which is moved in link with the connecting rod 164 advances and retreats in the X direction as the cam 163 is rotated. The sensor 168 capable of detecting an imaging start position (i.e., exposure start timing) is provided at the cam-163-side end of the longitudinal hole 161z. A Hall element or a proximity switch, for example, is used as the sensor 168 and detects approach of, for example, a magnet attached to the end portion of the connecting rod 164.

Figure 37:
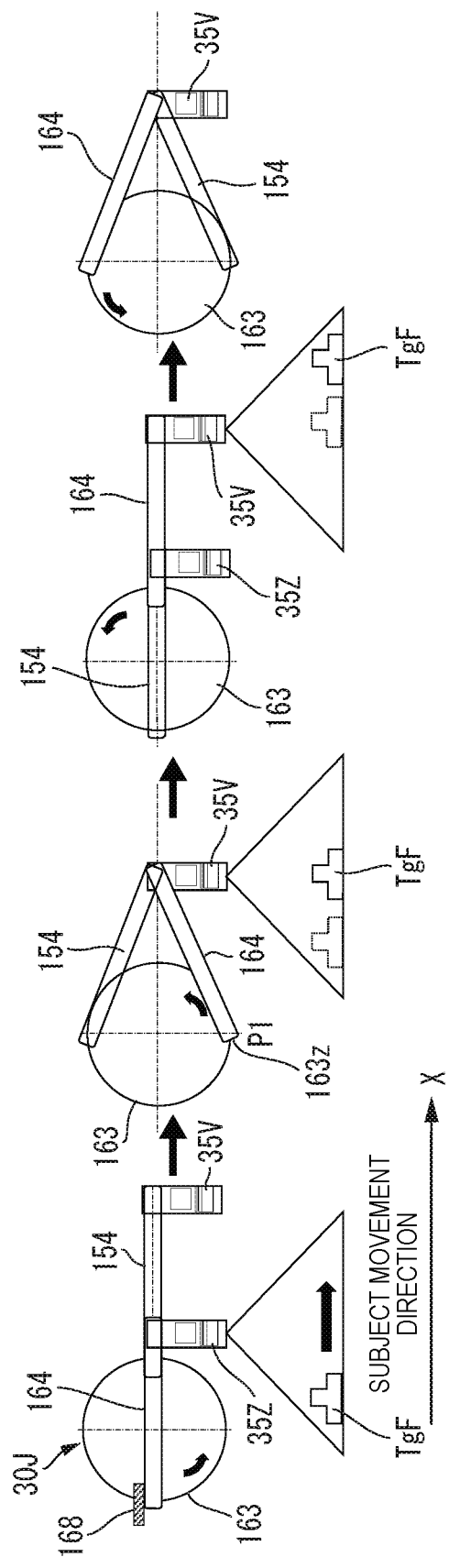
FIG. 37 is a diagram for description of an example imaging operation of the camera unit according to the fifth embodiment.

FIG. 37 is a diagram for description of an example imaging operation of the camera unit 30J according to the fifth embodiment. In the camera unit 30J according to the fifth embodiment, the two piston mechanisms 150 and 160 cause the camera heads 35Z and 35V to advance and retreat alternately in the X direction which is the same as a movement direction MVS of subjects TgF. In the camera unit 30J according to the fifth embodiment shown in FIG. 37, the camera head 35Z captures plural subjects TgF. In FIG. 37, the two guide plates 151 and 161 are omitted to simplify the description.

The camera head 35Z starts exposure (i.e., starts transmitting an image taken to the camera control unit 50) as soon as the rear end of the connecting rod 154 is detected by the sensor 158 (i.e., an imaging start position is detected). Timing at which the relative speed between the camera head 35Z and a subject TgF becomes 0 is timing at which the distance between camera head 35Z and the subject TgF becomes smallest. When the connecting rod 154 reaches the end that is opposite to the sensor 158, the camera head 35Z stops the imaging (i.e., transmission of an image taken to the camera control unit 50 is stopped).

At timing when the camera head 35Z stops imaging, an imaging start position is detected is detected by the sensor 168 and the camera head 35V starts exposure (i.e., starts transmitting an image taken to the camera control unit 50). Timing at which the relative speed between the camera head 35V and the next subject (not shown) becomes approximately equal to 0 is timing at which the distance between camera head 35V and the next subject becomes smallest. When the connecting rod 164 reaches the end that is opposite to the sensor 168, the camera head 35V stops the imaging (i.e., transmission of an image taken to the camera control unit 50 is stopped).

Where the camera unit 30J moves in the direction MV5 and plural subjects are stopped, each of the two camera heads 35Z and 35V captures a subject while moving in the −X direction. In this case, the relative speed between each of the two camera heads 35Z and 35V and a subject becomes approximately equal to 0 at timing when the distance between the camera head 35Z or 35V and the subject becomes smallest.

The same operation as described above is performed repeatedly. In the camera unit 30J according to the fifth embodiment, the relative speed between each of the camera heads 35Z and 35V and a subject TgF becomes approximately equal to 0 at timing when the two engagement portions 153z and 163z reach a position P1. At this time, a rotation speed of the rotary motor 37 is calculated on the basis of a movement speed of the subject TgF, a movement speed of the camera unit 30J, and movement speeds of the two camera heads 35Z and 35V so that the relative speed between each of the camera heads 35Z and 35V and the subject TgF becomes approximately equal to 0.

In the camera unit 30J according to the fifth embodiment, angles of view of the camera heads 35Z and 35V overlap with each other because the piston mechanisms 150 and 160 are adjacent to each other and the camera heads 35Z and 35V are located close to each other.

Figure 38:
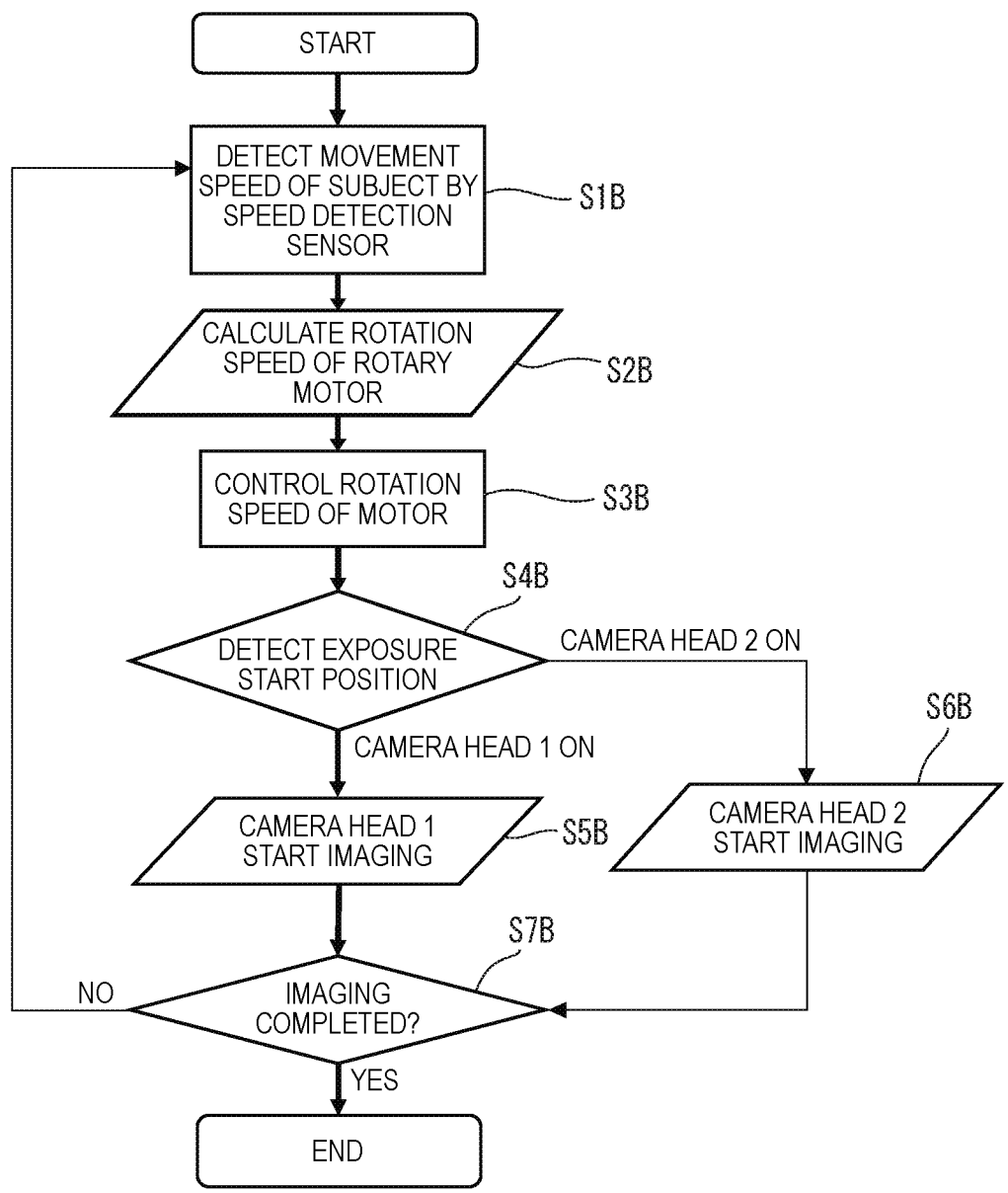
FIG. 38 is a flowchart showing an example operation procedure of a manufacturing system according to the fifth embodiment.

FIG. 38 is a flowchart showing an example operation procedure of a manufacturing system according to the fifth embodiment. A description will be made with reference to FIG. 18 with an assumption that subjects TgF are moving subjects.

At step S1B, the motor control unit 51A receives and acquires speed information of subjects TgF from the work speed detection sensor 45. Where the camera unit 30J is moved, the motor control unit 51A receives movement speed information of the camera unit 30J.

At step S2B, the motor control unit 51A calculates, on the basis of the received speed information of the subjects TgF, a rotation speed R of the rotary motor 37 for causing the cams 153 and 163 to be driven rotationally so that relative speed between each of the two camera heads 35Z and 35V and a subject TgF becomes equal to 0.

At step S3B, the motor control unit 51A generates a control signal to be used for rotating the rotary motor 37 on the basis of the calculated rotation speed R and transmits the generated control signal to the rotary motor 37. The rotary motor 37 is driven rotationally at the rotation speed R on the basis of the received control signal.

At step S4B, the camera control unit 52 detects timing when the camera head 35Z or 35V is to start imaging on the basis of detection information of each of the two sensors 158 and 168.

If at step S4B the camera control unit 52 detects timing when the camera head 35Z is to start imaging on the basis of detection information of each of the two sensors 158 and 168 (S4B: camera head 1 on), at step S5B the camera control unit 52 starts reception of images taken by the camera head 35Z.

If at step S4B the camera control unit 52 detects timing when the camera head 35V is to start imaging on the basis of detection information of each of the two sensors 158 and 168 (S4B: camera head 2 on), at step S6B the camera control unit 52 starts reception of images taken by the camera head 35V.

At step S7B, the camera control unit 50A judges whether the camera unit 30J has completed a prescribed imaging process that was set by the user. For example, the camera control unit 50A may finish the imaging either when an inspection interval set by the user has passed or when an inspection finishing manipulation is made by the user.

If judging that the imaging has not been completed yet (S7B: no), the camera control unit 50A returns to step S1B.

On the other hand, if judging that the imaging has been completed (S7B: yes), the camera control unit 50A finishes the inspection process.

As described above, the camera unit 30J according to the fifth embodiment in which the camera head 35Z and the camera head 35V advance and retreat alternately, plural subjects TgF can be captured successively. As a result, the camera control unit 50A can suppress image blurring in a direction opposite to the movement direction of the subjects TgF.

Although the various embodiments have been described above with reference to the drawings, it goes without saying that the present disclosure is not restricted to those embodiments. It is apparent that those skilled in the art would be able to conceive various changes and modifications without departing from the scope of the claims, and they should naturally be construed as belonging to the technical scope of the disclosure.

For example, although the camera unit 30A of the manufacturing system 100A according to the first modification of the first embodiment is installed fixedly whereas the plural subjects Wk are conveyed by the belt conveyor 110, the camera unit 30A may be installed on the inspection vehicle 10 and capture each of the subjects Wk while moving. As a result, the manufacturing system 1004 can be increased in imaging speed.

As described above, the camera unit 30 (camera device) is equipped with the at least one camera head 35 (imaging unit) which captures the rail 80 (subject), the rotary motor 37 (rotary motor) which rotates the camera head 35 at a prescribed rotation speed a harness 43 (output unit) which outputs images taken by the camera head 35, the drum 31 (body) which incorporates the camera head 35, the rotary motor 37, and the harness 43. The harness 43 outputs at least one image, among the images, taken at an imaging position where the camera head 35 and a surface of the rail 80 are approximately parallel with each other. With the above configuration, the camera unit 30 can produce a clear image by imaging the rail 80 (subject) can acquire a clear image simply in a short time and hence increase the production efficiency.

The camera head 35 is installed so as to be capable of imaging in a direction that is perpendicular to a rotation axis of the drum 31. This makes it possible to produce a clear image by imaging the rail 80 (subject) consecutively.

The camera head 35 is installed so as to be capable of imaging in a direction that is parallel with a rotation axis of the drum 31. With this measure, the camera head 35 can capture the subject in such a state that the angle of view deviation from the center in an imaging duration is small, whereby image blurring can be suppressed.

The four camera heads 35A, 35B, 35C, and 35D (plural imaging units) are disposed in the same circumferential surface that is perpendicular to the rotation axis of the drum 31. With this measure, each camera head 35 can capture the subject from a position that is close to the subject. Furthermore, the resolution of images taken can be increased when the camera head 35 captures a subject that is moving at a high speed. Still further, the distortion of each image can be suppressed because peripheral portions of each image are taken so as to overlap with each other, whereby the resolution of overlap portions of each image can be increased.

The camera unit 30D is further equipped with the at least one mirror 46J and 46L and at least one opening 44J through which light coming from the imaging position passes to shine on the mirrors 46J and 46L. Among the four camera heads 35I, 35J, 35K, and 35L, each the camera heads 35J and 35L (at least one imaging unit) captures a subject on the basis of light reflected by the mirror 46J or 46L. As a result, with the intervention of the mirrors 46J and 46L, the four imaging elements are arranged so that their optical axes are arranged parallel with each other. Furthermore, the four camera heads 35I, 35J, 35K, and 35L are disposed close to each other near the center of the drum 31C, In a central portion of the drum 31C, a small empty space remains and the two image devices and the two mirror 46J or 46L are arranged densely. This configuration accelerates miniaturization of the camera unit 30D.

The camera unit 30H is further equipped with the first gear 131 which is coupled with the rotary motor 37 and transmits rotational power of the rotary motor 37 and the second gear 132 which is coupled with the first gear 131 and transmits rotational power from the first gear 131 to the camera head 35W. The camera head 35W is rotated via the first gear 131 and the second gear 132 so that its imaging direction always coincides with a direction at the imaging position. With this measure, a subject can be captured without blurring of the camera head 35W. Furthermore, a subject can be captured from right above from a start to an end of imaging. As a result, the number of images can be increased that can be captured squarely and a high-resolution image can be obtained by pixel-by-pixel addition using many images taken.

The camera unit 30J is further equipped with two connecting rods 154 and 164 each of which has a camera head 35Z or 35V on the side of its one end, two cams 153 and 163 connected to the other ends of the connecting rods 154 and 164, respectively; and a drive shaft 152 which is connected to the rotary motor 37 and transmits rotational power of the rotary motor 37 to the two cams 153 and 163. The camera heads 35Z and 35V capture the subject alternately. With this measure, since the two camera heads 35Z and 35V advance and retreat alternately, one of them is moved in the same direction as a subject is. One of the camera heads 35Z and 35V can capture a subject at timing when the relative speed between a movement speed of the subject and a movement speed of the one camera head 35Z or 35V is made equal to 0.

The camera unit 30A is further equipped with the subject speed detection sensor 45 (subject speed detection unit) which detects a movement speed of the work Wk (subject) on the basis of images taken. With this measure, a speed of a work can be detected easily without using an additional electronic component by performing image analysis on the images taken.

The motor control unit 51 calculates and sets a rotation speed of the rotary motor 37 that makes a relative speed between the camera head 35 and the subject located at the imaging position equal to 0. With this measure, the camera head 35 can capture a subject in a state that the subject is stationary relative to the camera head 35. This makes it possible to suppress image blurring in the direction opposite to the moving direction that is prone to occur when the camera head 35 captures a moving subject.

In the manufacturing system 100, the camera unit 30 (camera) which is installed in an inspection cart 10 captures a subject such as the rail 80. The inspection cart 10 and the image processing device are connected to each other by a wired or wireless network so as to be able to communicate with each other. The camera unit 30 transmits at least one image taken at an imaging position where the subject and the camera head 35 being rotated at a rotation speed R (prescribed rotation speed) of the rotary motor 37 are approximately parallel with each other. The image processing device analyzes a state of the subject on the basis of the received at least one image and outputs an analysis result. This configuration increases the production efficiency.

The manufacturing system 100 is equipped with the inspection cart 10 (conveying device) which moves the camera unit 30 at a prescribed movement speed. The motor control unit 51A calculates and sets, for the rotary motor 37, a rotation speed that makes a relative speed between the camera head 135 and the subject located at the imaging position equal to 0 on the basis of the movement speed of the inspection cart 10. With this measure, the camera head 135 can capture a subject in a state that the subject is stationary relative to the camera head 35. This makes it possible to suppress image blurring in the direction opposite to the moving direction that is prone to occur when the camera head 35 captures a moving subject.

Although the various embodiments have been described above with reference to the drawings, the present disclosure is not restricted to those embodiments. It is apparent that those skilled in the art would be able to conceive various changes, modifications, replacements, additions, deletions, and equivalents without departing from the scope of the claims, and they should naturally be construed as belonging to the technical scope of the disclosure. Furthermore, constituent elements of some of the above-described various embodiments may be combined in a desired manner without departing from the spirit and scope of the disclosure.

INDUSTRIAL APPLICABILITY

The present disclosure is useful in providing camera devices and manufacturing systems capable of acquiring a clear image simply in a short time and thereby increasing the production efficiency.

What is claimed is:

1. A camera device comprising:
at least one imaging unit which is configured to capture an image of a subject;
a rotary motor which rotates the imaging unit at a prescribed rotation speed;
an output unit which outputs images captured by the imaging unit;
a body which incorporates the imaging unit, the rotary motor, and the output unit;
a subject speed detection unit which detects a movement speed of the subject, wherein
the imaging unit identifies an imaging position for the subject, the imaging position being where the imaging unit and the subject are approximately parallel with each other, and identifies an image captured at the imaging position as a target image,
wherein the output unit outputs the target image for transmission, among the images, captured at an imaging position where the imaging unit and the subject are approximately parallel with each other, and
wherein a rotation speed of the rotary motor that makes a relative speed between the imaging unit and the subject located at the imaging position equal to 0 is calculated and set.

2. The camera device according to claim 1, wherein the imaging unit is installed so as to be capable of capturing in a vertical direction that is perpendicular to a rotation axis of the body.

3. The camera device according to claim 1, wherein the imaging unit is installed so as to be capable of capturing in a same direction as a rotation axis of the body.

4. The camera device according to claim 1, wherein a plurality of the imaging units are disposed in a vertical direction that is perpendicular to a rotation axis of the body, and are arranged in a same plane.

5. The camera device according to according to claim 1, further comprising:
at least one mirror; and
at least one opening through which light coming from the imaging position passes to shine on the mirror,
wherein at least one of the imaging units captures the subject on the basis of light reflected by the mirror.

6. The camera device according to according to claim 1, further comprising:
a first gear which is coupled with the rotary motor and transmits rotational power of the rotary motor; and
a second gear which is coupled with the first gear and transmits rotational power from the first gear to the imaging unit,
wherein the imaging unit is rotated via the first gear and the second gear so that an imaging direction always coincides with a direction at the imaging position.

7. A camera device comprising:
at least one imaging unit which captures a subject;
a rotary motor which rotates the imaging unit at a prescribed rotation speed;
an output unit which outputs images captured by the imaging unit;
a body which incorporates the imaging unit, the rotary motor, and the output unit;
at least two connecting rods each of which has an imaging unit on one end;
at least two cams connected to another end of the connecting rods, respectively; and
a drive shaft which is connected to the rotary motor and transmits rotational power of the rotary motor to the cams,
wherein the output unit outputs at least one image, among the images, captured at an imaging position where the imaging unit and the subject are approximately parallel with each other, and
wherein each of a plurality of the imaging units captures the subject alternately.

8. A manufacturing system comprising:
a camera which captures an image of a subject; and an image processing device which is communicably connected to the camera, a subject speed detection unit which detects a movement speed of the subject based on one or more images captured by the camera, wherein the camera is rotated at a prescribed rotation speed by a rotary motor, the camera identifies an imaging position for the subject, the imaging position being where the camera and the subject are approximately parallel with each other, and identifies an image captured at the imaging position as a target image, wherein the camera transmits, to the image processing device, the target image, among the one or more images captured by the camera, the image processing device analyzes a state of the subject on the basis of the target image received from the camera and outputs an analysis result, and a rotation speed of the rotary motor that makes a relative speed between the camera and the subject located at the imaging position equal to 0 is calculated and set.

9. The manufacturing system according to claim 8, further comprising a conveying device which moves the camera at a prescribed movement speed, wherein the rotation speed of the rotary motor that makes the relative speed between the imaging unit and the subject located at the imaging position equal to 0 is calculated and set on the basis of the movement speed of the conveying device.

* * * * *